United States Patent
Blankenbecler et al.

(10) Patent No.: US 12,322,059 B2
(45) Date of Patent: Jun. 3, 2025

(54) SYSTEM AND METHOD FOR REMOVING BRACKETS FROM CUSTOMIZED ORTHODONTIC APPLIANCES AND PRODUCTS

(71) Applicants: Todd Blankenbecler, Atlanta, GA (US); Tom Zambito, East Amherst, NY (US); Marc Lemchen, New York, NY (US); EasyRx LLC., Atlanta, GA (US)

(72) Inventors: Todd Blankenbecler, Atlanta, GA (US); Tom Zambito, East Amherst, NY (US); Marc Lemchen, New York, NY (US)

(73) Assignee: EASYRX LLC., Atlanta, GA (US)

( * ) Notice: Subject to any disclaimer, the term of this patent is extended or adjusted under 35 U.S.C. 154(b) by 266 days.

(21) Appl. No.: 17/916,407

(22) PCT Filed: Mar. 29, 2021

(86) PCT No.: PCT/US2021/024599
§ 371 (c)(1),
(2) Date: Sep. 30, 2022

(87) PCT Pub. No.: WO2021/202347
PCT Pub. Date: Oct. 7, 2021

(65) Prior Publication Data
US 2023/0142509 A1 May 11, 2023

Related U.S. Application Data

(60) Provisional application No. 63/003,568, filed on Apr. 1, 2020.

(51) Int. Cl.
*G06T 19/20* (2011.01)
*A61C 7/02* (2006.01)
*A61C 7/14* (2006.01)

(52) U.S. Cl.
CPC .............. *G06T 19/20* (2013.01); *A61C 7/02* (2013.01); *A61C 7/146* (2013.01); *G06T 2210/41* (2013.01); *G06T 2219/2021* (2013.01)

(58) Field of Classification Search
CPC ........... A61C 7/02; A61C 7/146; G06T 19/20; G06T 2210/41; G06T 2219/2021
See application file for complete search history.

(56) References Cited

U.S. PATENT DOCUMENTS 9,503,282 B2 * 11/2016 Kody .................. H04N 1/0022
10,413,385 B2    9/2019 Sherwood et al.
(Continued)

FOREIGN PATENT DOCUMENTS

EP            2467088          6/2012

*Primary Examiner* — Nicholas D Lucchesi
(74) *Attorney, Agent, or Firm* — MH2 Technology Law Group, LLP

(57) ABSTRACT

A system and method that is a web based application for creating and managing orthodontic laboratory prescriptions within a dental clinic or lab. The system receives a standard triangle language (STL) image file which has been obtained from an intraoral digital scan or cone-beam of a patient's mouth and teeth. The user manually selects brackets, attachments, bands, or other appliances and removes them from the 3D image file via a series of selections made through an interface within a digital workspace. The system then calculates a surface of the tooth that was disposed beneath the removed appliance and integrates it into the 3D image to create a clean 3D image of the patient's teeth free from any appliances. After the appliances have been removed, the user may further refine the image of the patient's teeth using a suite of tools including addition, deletion, smoothening, and definition tools.

17 Claims, 26 Drawing Sheets

(56) References Cited

U.S. PATENT DOCUMENTS

| | | | |
|---|---|---|---|
| 10,548,691 B2 | 2/2020 | Lemchen et al. | |
| 11,103,330 B2 * | 8/2021 | Webber | B33Y 80/00 |
| 11,596,502 B2 * | 3/2023 | Webber | A61C 7/002 |
| 2009/0310846 A1 * | 12/2009 | Lemchen | G06T 19/003 |
| | | | 382/132 |
| 2013/0325431 A1 * | 12/2013 | See | A61C 7/002 |
| | | | 703/11 |
| 2014/0067334 A1 * | 3/2014 | Kuo | A61C 9/0046 |
| | | | 703/1 |
| 2014/0195892 A1 * | 7/2014 | Hampton | G06F 40/166 |
| | | | 715/234 |
| 2015/0097827 A1 * | 4/2015 | Cohen | G06T 5/77 |
| | | | 345/420 |
| 2015/0235399 A1 * | 8/2015 | Shechtman | G06T 5/77 |
| | | | 345/639 |
| 2016/0027151 A1 * | 1/2016 | Edwin | G06T 5/77 |
| | | | 382/195 |
| 2018/0206939 A1 * | 7/2018 | Kim | B33Y 80/00 |
| 2019/0287224 A1 * | 9/2019 | Amirghodsi | G06T 5/20 |
| 2020/0015936 A1 * | 1/2020 | Ye | A61C 7/12 |
| 2023/0048898 A1 * | 2/2023 | Cofar | A61C 13/0004 |
| 2023/0051506 A1 * | 2/2023 | Cofar | G16H 30/40 |
| 2023/0068727 A1 * | 3/2023 | Saphier | G06T 17/20 |
| 2024/0221308 A1 * | 7/2024 | Kopp | G16H 30/40 |

* cited by examiner

| EasyRx EasyVid-Bracket Removal | | | | | | |
|---|---|---|---|---|---|---|
| Removable: Labial Bow, Acrylic, 2 Adams Clasps | | | | | | |
| File Uploads 24  ⊘ EasyRx 3D | | | | | | |

🔗 To attach files, drag and drop files here or select <u>files from your computer.</u>

Enter an OrthoAnalyzer Patient ID: [OrthoAnalyzer Patient ID]  ☐ OrthoAnalyzer

| Type | Name | Date ▼ | Size | | | | |
|---|---|---|---|---|---|---|---|
| ERK | EBR - In Pocess stl | 07/25/19 | 14.23 MB | MII | Ⓢ | Sp | 🦋 | ⓘ | × |
| ERK | <u>BR in Process stl</u> | 07/25/19 | 14.23 MB | MII | Ⓢ | Sp | 🦋 | ⓘ | × |
| ERK | 3_Demo_EBR(3) stl | 07/03/19 | 14.23 MB | MII | Ⓢ | Sp | 🦋 | ⓘ | × |
| ERK | 3_Demo_EBR(4) stl | 07/03/19 | 14.23 MB | MII | Ⓢ | Sp | 🦋 | ⓘ | × |
| ERK | 3_Demo_EBR(3) stl | 07/02/19 | 14.23 MB | MII | Ⓢ | Sp | 🦋 | ⓘ | × |
| ERK | 3_Demo_EBR stl | 07/01/19 | 14.23 MB | MII | Ⓢ | Sp | 🦋 | ⓘ | × |

Scroll for details ⌄

SYSTEM AND METHOD FOR REMOVING BRACKETS FROM CUSTOMIZED ORTHODONTIC APPLIANCES AND PRODUCTS

BACKGROUND

Field of the Technology

The invention relates to the field of manufacturing and documenting the process of customized orthodontic and dental appliances.

Description of the Prior Art

In the orthodontic office and laboratory, prescriptions which were once prepared manually with resin impressions or molds are more and more being carried out in a digital workspace. Instead of creating a physical mold of the patient's teeth which can be uncomfortable for the patient or time consuming, the patient simply scans their mouth and teeth via an intraoral digital scan.

Once the patient has had their teeth digitally scanned, the orthodontist may take data from the scan to create a 3D image which corresponds to the patient's teeth. Since each prescription is unique to each patient and may be made up of multiple parts or appliances with very specific designs, the 3D image is manipulated accordingly to add or remove any appliances which may be necessary to carry out the orthodontist's new or updated prescription. Once complete, specifications corresponding to the appliances added to the 3D image and the 3D image itself are sent out to a lab for manufacture. Use of a 3D model allows the orthodontist to virtually apply or reapply different appliances to the patient's teeth without having to use a physical casting of the patient's teeth, thus dramatically cutting down on the time and expense required for preparing a patient's orthodontic prescription.

A problem develops however for those patients who are already wearing orthodontic appliances including brackets for braces who then undergo an intraoral scan to have their prescription altered or changed. The resulting 3D image of the patient's teeth therefore inherently includes these pre-existing appliances, making it difficult if not impossible for the orthodontist to apply new orthodontic appliances or adjust preexisting ones within the 3D image.

What is needed is a method for removing orthodontic appliances including brackets from 3D images. The method should be simple and easy to use as well as fast to implement with a minimum of interceding steps.

BRIEF SUMMARY

The illustrated embodiments of the invention include within their scope a method of prescription management for use with an orthodontic or dental lab and a prescribing user. The method includes obtaining a 3D image corresponding to a patient's teeth, removing brackets from the 3D image and/or restoring and refining the 3D image after the bracket has been removed. The modified 3D image may then be used when designing a customized orthodontic or dental appliance and thus assist the prescribing user update the prescription for the patient.

The current invention provides a method for removing image data corresponding to an orthodontic or dental appliance from a 3D image of a patient's teeth. The method includes selecting the image data corresponding to at least one appliance to be removed from the 3D image and then deleting the selected image data corresponding to the at least one appliance from the 3D image. Specifically, selecting the image data which corresponds to the at least one appliance includes forming a boundary within the 3D image around the image data which corresponds to the at least one appliance. Next, the image data which corresponds to the at least one appliance and contained within the formed boundary is deleted from the 3D image. Image data corresponding to a surface of a tooth which is disposed beneath the deleted image data is first calculated and then integrated with the remaining portion of the 3D image.

Additionally, the method may also include refining the specific image data which corresponds to the surface of the tooth that is disposed beneath the appliance which was just deleted from the 3D image. In one embodiment, refining the image data includes removing at least a portion of the image data that corresponds to the surface of the patient's teeth that is disposed beneath the deleted appliance. In another embodiment, refining the image data includes adding to at least a portion of the image data that corresponds to the surface of the patient's teeth that is disposed beneath the deleted appliance. In a further embodiment, refining the image data includes defining an intersection between the image data that corresponds to the surface of the patient's teeth that is disposed beneath the deleted appliance and the image data that corresponds to a gingiva margin of the patient within the 3D image. In yet another related embodiment, refining the image data includes smoothening at least a portion of the image data that corresponds to the surface of the patient's teeth that is disposed beneath the deleted appliance.

In another embodiment, the step of forming a boundary within the 3D image around the image data which corresponds to the at least one appliance specifically includes encircling the image data that corresponds to the at least one appliance with a line as defined by a user. Specifically, encircling the image data which corresponds to the at least one appliance with a line defined by the user may further include determining when an incomplete boundary around the image data corresponding to the at least one appliance is present and then notifying the user when the incomplete boundary has been detected. In a separate embodiment, forming the boundary within the 3D image around the image data that corresponds to the at least one appliance also includes erasing at least a portion of the boundary formed around the image data which corresponds to the at least one appliance.

In one particular embodiment, the image data which corresponds to an orthodontic or dental appliance specifically includes image data that corresponds to an orthodontic bracket. In a related embodiment, the image data that corresponds to an orthodontic bracket also includes at least a portion of an orthodontic wire. In yet another embodiment, the image data that corresponds to an orthodontic or dental appliance specifically includes image data that corresponds to an orthodontic band. Additionally, in one particular embodiment, the image data that corresponds to an orthodontic or dental appliance further includes image data that corresponds to relates to an orthodontic attachment.

In another embodiment, the method steps of calculating the image data and integrating the image data are performed automatically upon the deletion of the selected image data which corresponds to the at least one appliance from the 3D image.

The current invention further provides a system for removing image data which corresponds to an orthodontic or dental appliance from a 3D image of a patient's teeth. The system includes a digital workspace that is configured to display the 3D image and an interface that is disposed within the digital workspace and which includes at least one input means for forming a boundary around the image data that corresponds to at least one appliance within the 3D image. The system also includes a means for deleting the image data that corresponds to the at least one appliance within the boundary formed within the 3D image as well as a means for replacing the deleted image data with image data that corresponds to a surface of the tooth that is disposed beneath the deleted image data. The interface itself includes a plurality of input means for refining the image data which corresponds to the surface of the tooth that is disposed beneath the appliance which has just been deleted from the 3D image.

In one embodiment, the digital workspace of the system is configured to form the boundary around the image data which corresponds to the at least appliance in response to at least one input from a user as received by the interface disposed within the digital workspace.

In another embodiment, the system also includes means for calculating the image data corresponding to the surface of the tooth disposed beneath the deleted image data corresponding to the at least one appliance.

In yet another embodiment, the system also includes a database that is configured to store a current state of the 3D image.

In a further embodiment, the plurality of input means for refining the image data that corresponds to the surface of the tooth that is disposed beneath the deleted appliance includes an input means for removing at least a portion of the image data that corresponds to the surface of at least one of the patient's teeth, an input means for adding to at least a portion of the image data that corresponds to the surface of the tooth disposed beneath the deleted image data, an input means for defining an intersection between the image data that corresponds to the surface of the tooth and the image data that corresponds to a gingiva margin of the patient, and an input means for smoothening at least a portion of the image data that corresponds to the surface of the tooth that is disposed beneath the deleted image data corresponding to the at least one appliance.

In one embodiment, the system is a component of a web based application.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

BRIEF DESCRIPTION OF THE DRAWINGS

FIG. 7 further depicts the user using a smooth option provided by the bracket removal dashboard to smooth the surface of the 3D image following the removal of the bracket from the 3D image.

FIG. 8 further depicts the user using a carve option provided by the bracket removal dashboard to carve into the surface of the 3D image following the removal of the bracket from the 3D image.

FIG. 9 further depicts the user using a build option provided by the bracket removal dashboard to build onto the surface of the 3D image following the removal of the bracket from the 3D image.

FIG. 10 further depicts the user using a margin option provided by the bracket removal dashboard to further define the surface between the tooth and gum line of the 3D image following the removal of the bracket from the 3D image.

FIG. 12 is an illustration of a screenshot of the bracket removal dashboard providing a list of save files created by the user actuating the save button seen in FIG. 11.

FIG. 17 further depicts the user using a refine image option provided by the bracket removal dashboard to refine the surface of the 3D image following the removal of the band from the 3D image.

FIG. 21 further depicts the user using a refine image option provided by the bracket removal dashboard to refine the surface of the 3D image following the removal of the attachment from the 3D image.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

The illustrated system and accompanying method relate to a web based application that is designed to create and manage orthodontic laboratory prescriptions within a dental clinic as well as the lab. The system receives a standard triangle language (STL) image file which has been obtained from an intraoral digital scan or a cone-beam CT scan of a patient's mouth and teeth, or a digital study model service from a lab. The method allows for orthodontists to manipulate their prescriptions or change prescriptions for patients who are already wearing braces or other orthodontic appliances which comprise brackets or other similar orthodontic components.

The current system and method disclosed herein may be a standalone or independent application, however more preferably the current system and method is meant to be a segment or a portion of a larger suite of digital orthodontic prescription management tools. For example, the current system and method is preferably integrated into the platforms disclosed in U.S. Pat. No. 10,299,891, entitled "System and Method for Ordering and Manufacturing Customized Orthodontic Appliances and Product", filed Mar. 16, 2016, and U.S. application Ser. No. 16/712,362, entitled "System and Method for Ordering and Manufacturing Customized Dental Appliances and the Tracking of Orthodontic Products," filed Dec. 12, 2019, both of which are incorporated herein by reference in their entirety.

Figure 1:
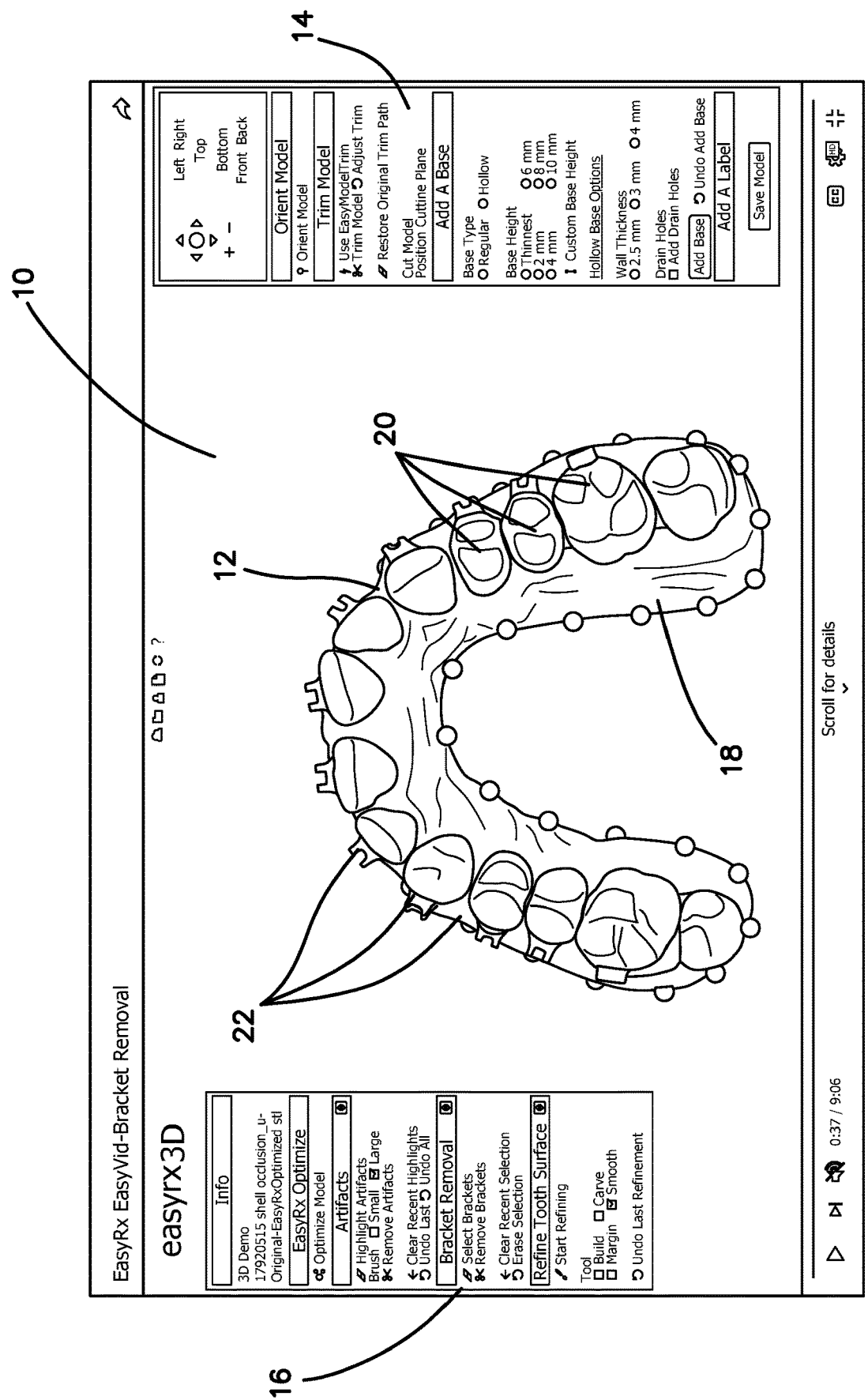
FIG. 1 is an illustration depicting a bracket removal dashboard provided by the current invention displaying a screenshot of a 3D image obtained from an intraoral scan of a patient.

The illustrated system and method can be understood by turning to FIGS. 1-12. The user, who may be a dentist, an orthodontist, or a lab, is presented with the bracket removal dashboard 10 that is associated with an account that is meant for the user as shown in FIG. 1 which shows a 3D image 12 obtained from an intraoral scan of a patient and the various tools available for the user to manipulate the 3D image 12, specifically a suite of orientation tools 14 and a suite of texture manipulation tools 16. The bracket removal dashboard 10 may be displayed on a personal computer, tablet, smartphone, or any other device which comprises a screen, a means for input, and a means for connecting to a wireless network such as the Internet. In FIG. 1, the 3D image 12 is seen as representing the upper jaw 18 and corresponding teeth 20 of a patient, where each of the patient's teeth comprises an orthodontic bracket 22. It should be noted however that the 3D image 12 may comprise additional or different portions of the patient's mouth and additional or different orthodontic appliances from what is explicitly shown. For example, the 3D image 12 may instead be a representation of the lower teeth of the patient or an alternative appliance such as a band or other attachment.

Figure 2:
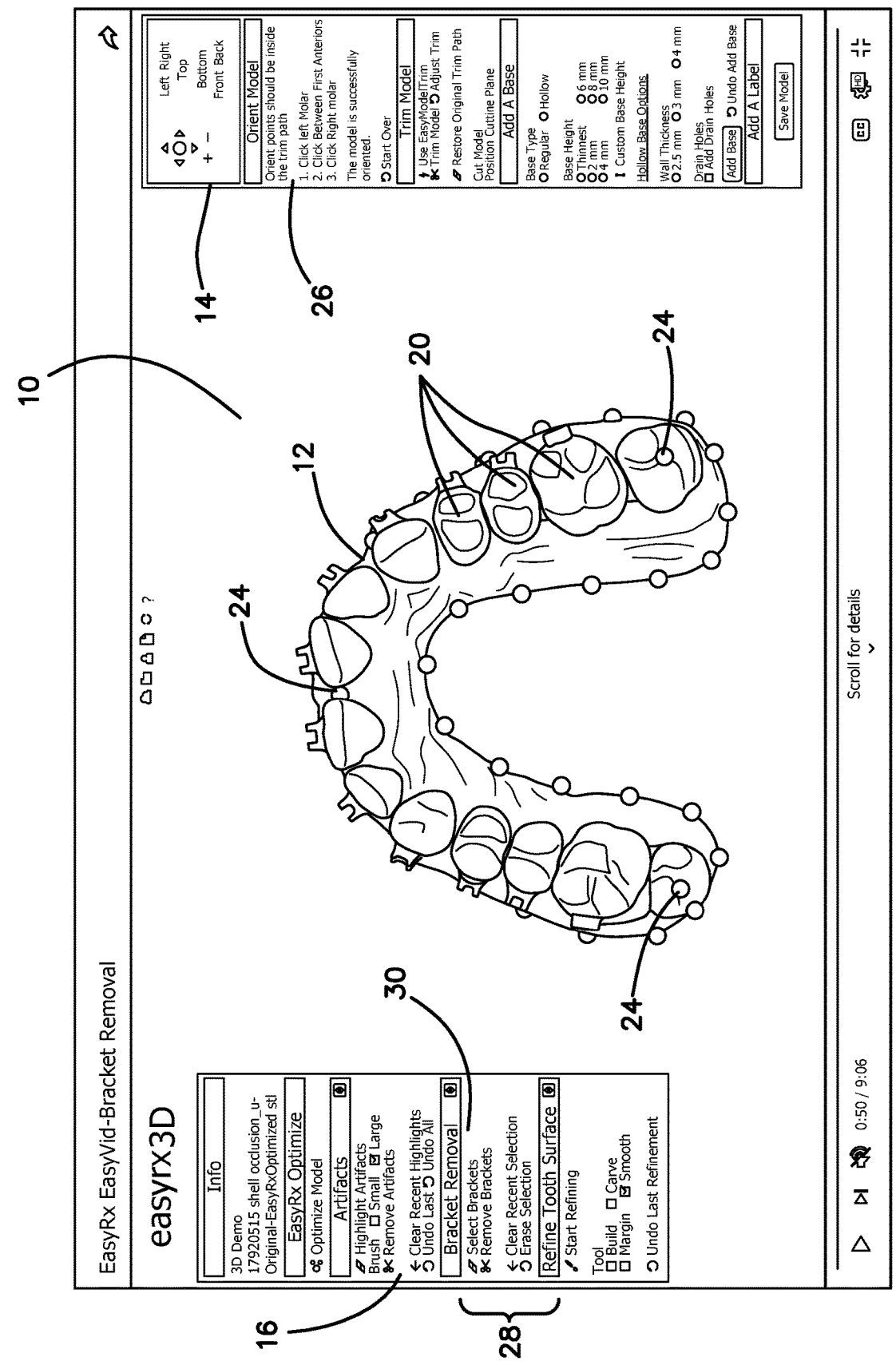
FIG. 2 is an illustration of the bracket removal dashboard seen in FIG. 1 highlighting the suite of orientation tools and a plurality of pips placed on the 3D image by the user.

In order to remove brackets or other orthodontic appliances from the 3D image 12, the user first needs to orientate the model. Once a patient's 3D image 12 is shown on the bracket removal dashboard 10, the user selects a tool from the suite of orientation tools 14. As depicted in FIG. 2, the suite of orientation tools 14 includes an orient model tool 26. Once the orient model tool 26 is selected, orient model tool 26 lists which teeth 20 the user should select in order to create the triangular shape needed to properly orientate and manipulate the 3D image 12, for example the left molar, between the incisors, and the right molar. The user then selects or marks on the 3D image 12 the positions requested by the orient model tool 26, each time leaving a pip 24. After the third pip 24 is placed, the algorithm running the bracket removal dashboard 10 performs the necessary computations to properly orientate the 3D image 12, thereby allowing the user to rotate and magnify the 3D image 12 as needed.

Figure 3A:
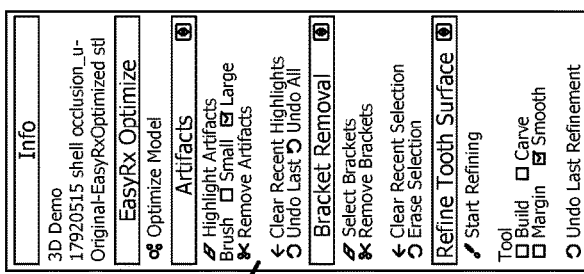
FIG. 3A is an illustration of the bracket removal dashboard after the 3D image seen in FIG. 1 has been orientated to display the patient's upper front teeth.
Figure 3B:
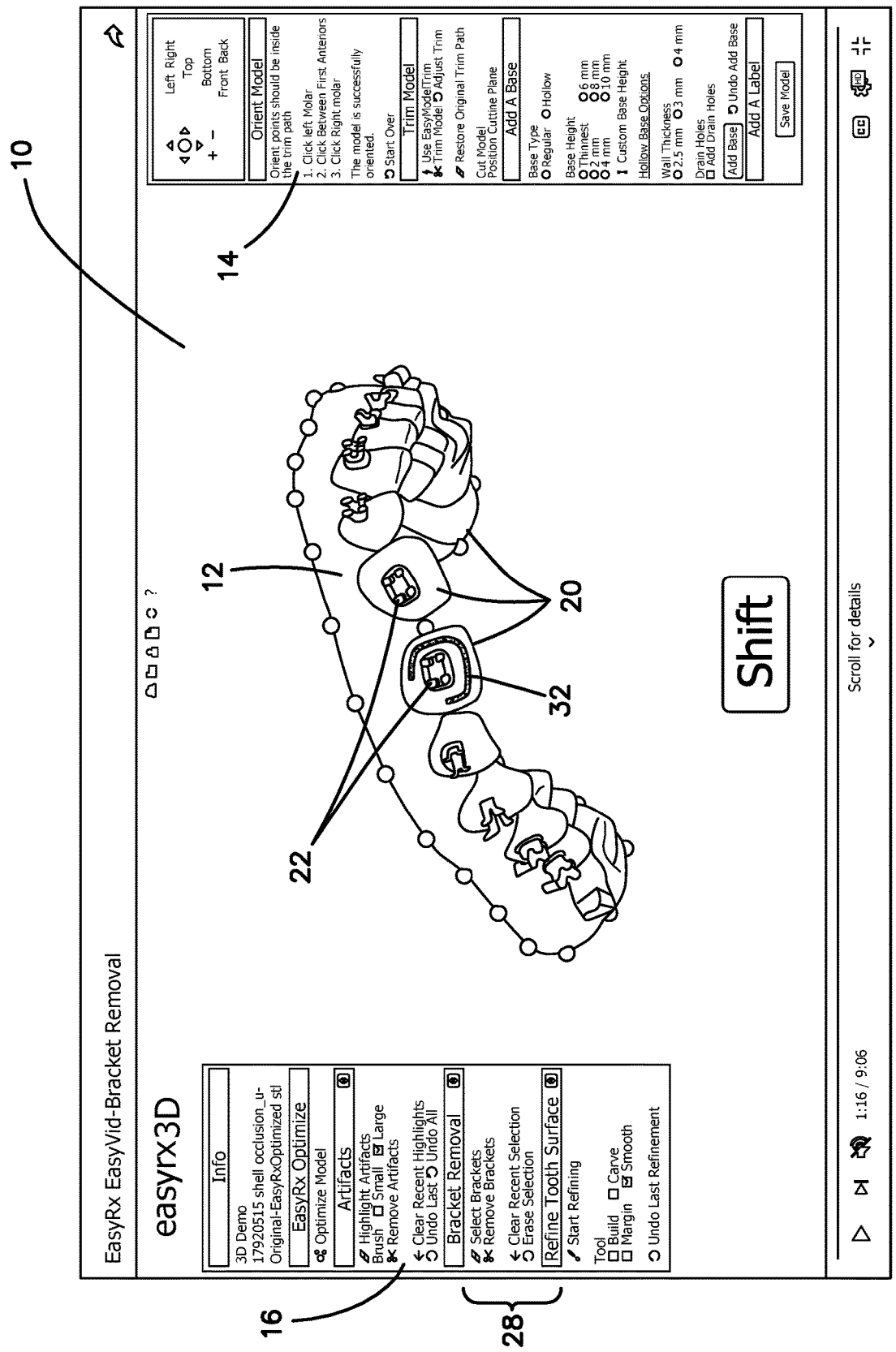
FIG. 3B is an illustration of the bracket removal dashboard seen in FIG. 3A after the user has begun to outline a bracket disposed on one of the patient's teeth after actuating the select brackets option provided by the current invention.
Figure 3C:
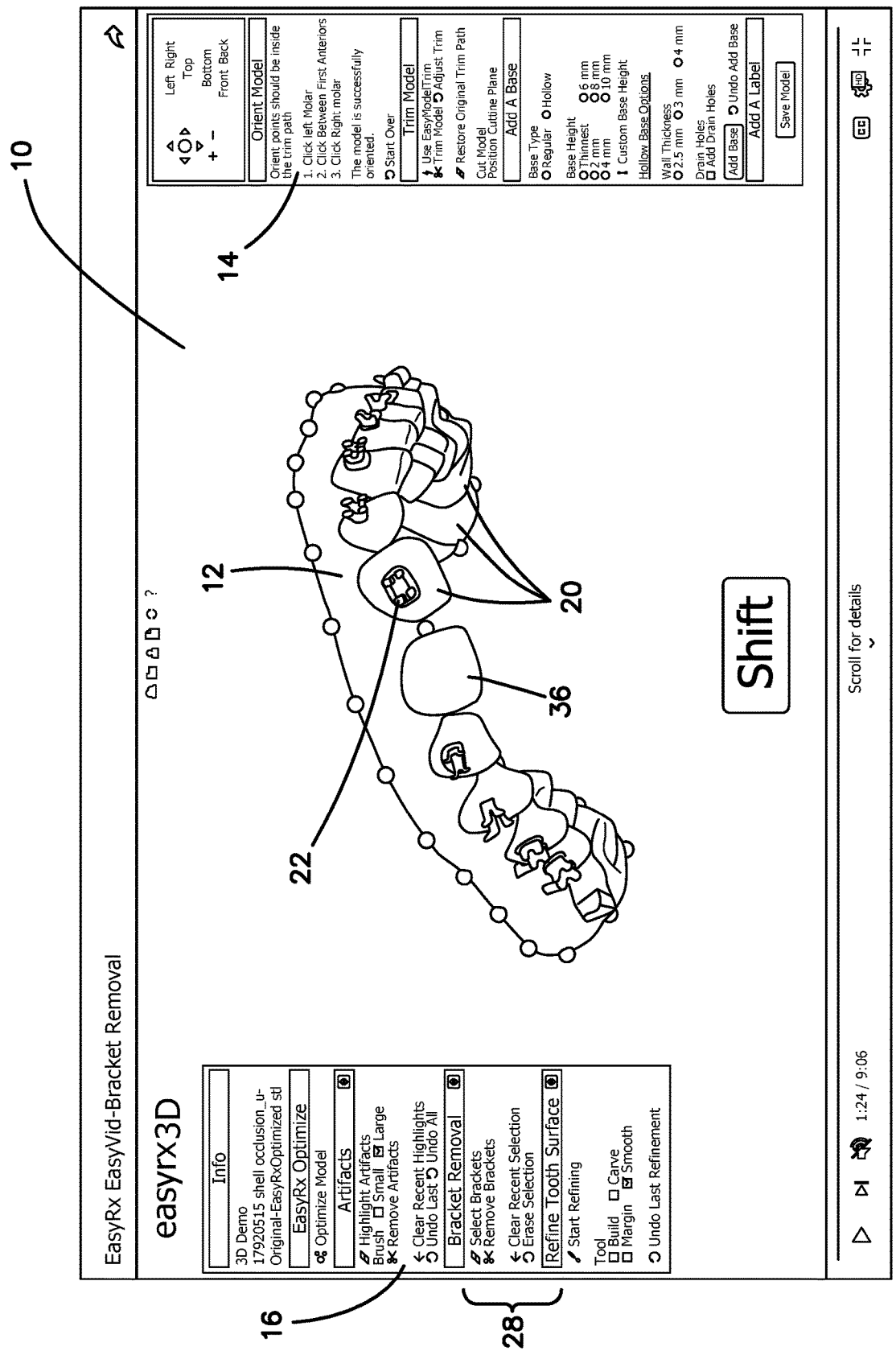
FIG. 3C is an illustration of the bracket removal dashboard seen in FIG. 3B after the user completed outlining the bracket and has actuated the remove brackets option provided by the current invention.

The bracket removal dashboard 10 is the designated area for a user to perform any designing or modification to the 3D image 12. The user begins removing brackets 22 from the 3D image 12 by first orientating the 3D image 12 so as to best see the brackets 22 to be removed, for example by rotating the 3D image 12 to show the patient's upper front teeth 20, namely the patient's incisors as seen in FIG. 3A. The user may further zoom in or magnify the 3D image 12 to more clearly see detail of the 3D image 12. The user then selects the "Select Brackets" option 30 within a bracket removal tool 28 which itself is a portion of the suite of texture manipulation tools 16. The user then selects the bracket 22 to be removed and then begins tracing or outlining the bracket 22 as seen in FIG. 3B. In one embodiment the user outlines the bracket 22 using a mouse and keyboard, however the user may use any suitable means for input now known or later devised such as a stylus, joystick, controller, or their fingertip. As the user traces around the bracket 22, a line 32 is created and which continues to form a boundary around the circumference or footprint of the bracket 22 until the bracket 22 is completely encircled by the line 32. Next, as seen in FIG. 3C, the user selects the Remove Brackets option 34 within the bracket removal tool 28. The algorithm underlying the bracket removal dashboard 10 then removes or deletes the image data contained within the loop or circle created by the line 32 which effectively removes the selected bracket 22 from the 3D image 12. The result therefore is to create a tooth or tooth surface 36 which is free from the bracket 22 in a single actuation or step, namely the selecting of the Remove Brackets option 34 within the bracket removal tool 28.

More specifically, the algorithm, using the location of the loop or circle as defined by the line 32 drawn by the user, removes the brackets 22 within the circle and calculates what the surface of the tooth 20 most likely looks like under the bracket 22, and re-creates that tooth surface 20 in the 3D image 12. In other words, the algorithm calculates the curvature of the tooth 20 to get the "new" surface of the tooth 20 as close as possible to the true shape of the patient's tooth. Without the algorithmic estimation and re-creation of the surface of the tooth 20, simply deleting the bracket 22 from the 3D image 12 would result in creating a hole or a flat surface on the tooth 20 where the bracket 22 was previously located, thereby requiring the user to do much more refining to get the surface of the tooth 20 correct.

Figure 4:
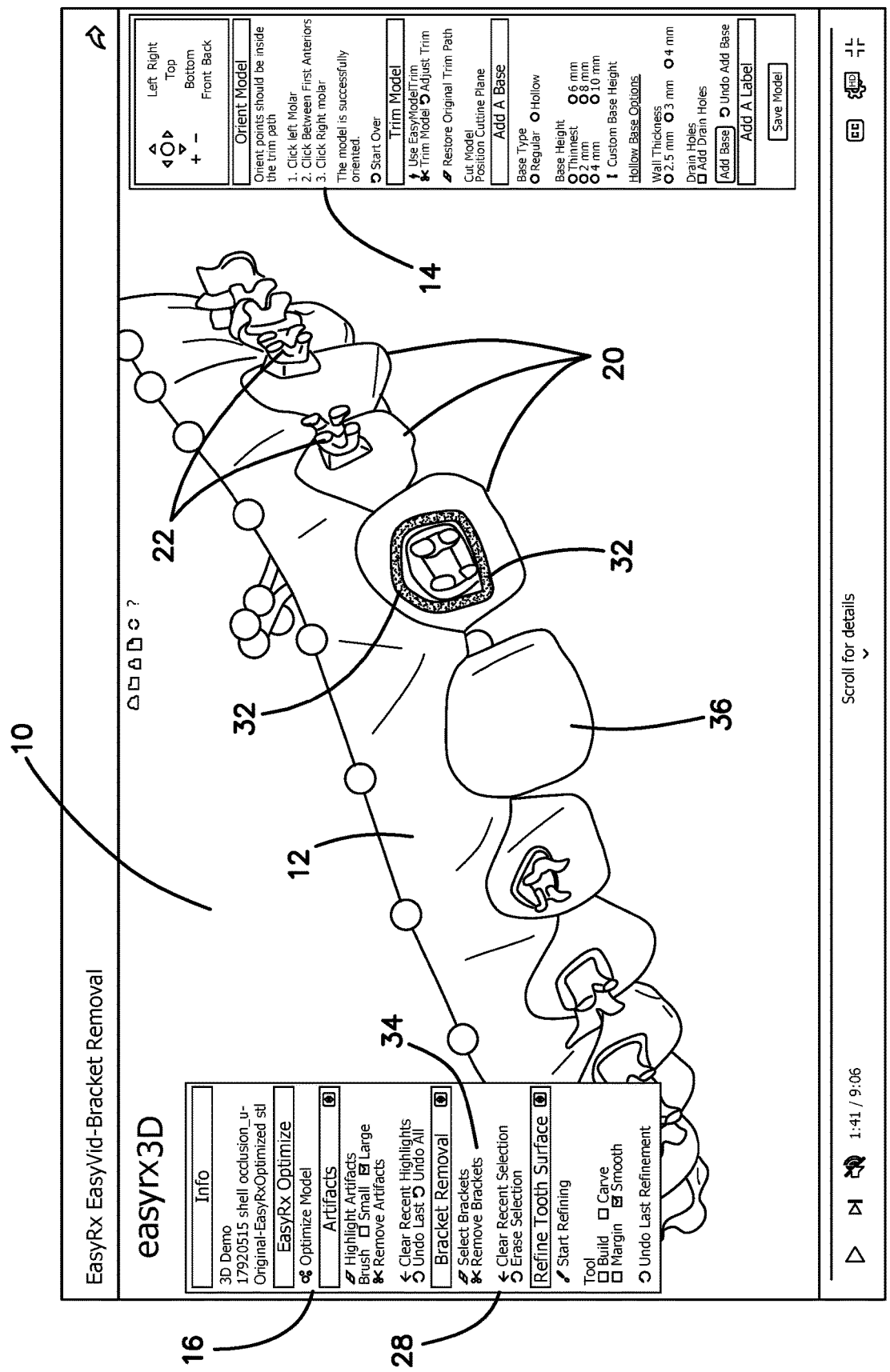
FIG. 4 is an illustration of the bracket removal dashboard after the user has removed a first bracket as seen in FIG. 3C and has started outlining a second bracket on an adjacent tooth of the patient.

After removing the bracket 22 from a first tooth 20, the user may move on to another one of the plurality of teeth 20 contained within the 3D image 12. For example, as seen in FIG. 4, the user may move over to the next adjacent tooth 20 and repeat the process of encircling the bracket 22 with the line 32 and then selecting the Remove Brackets option 34 which then alters the 3D image 12 by removing the bracket 22 contained or encircled within the line 32.

Figure 5A:
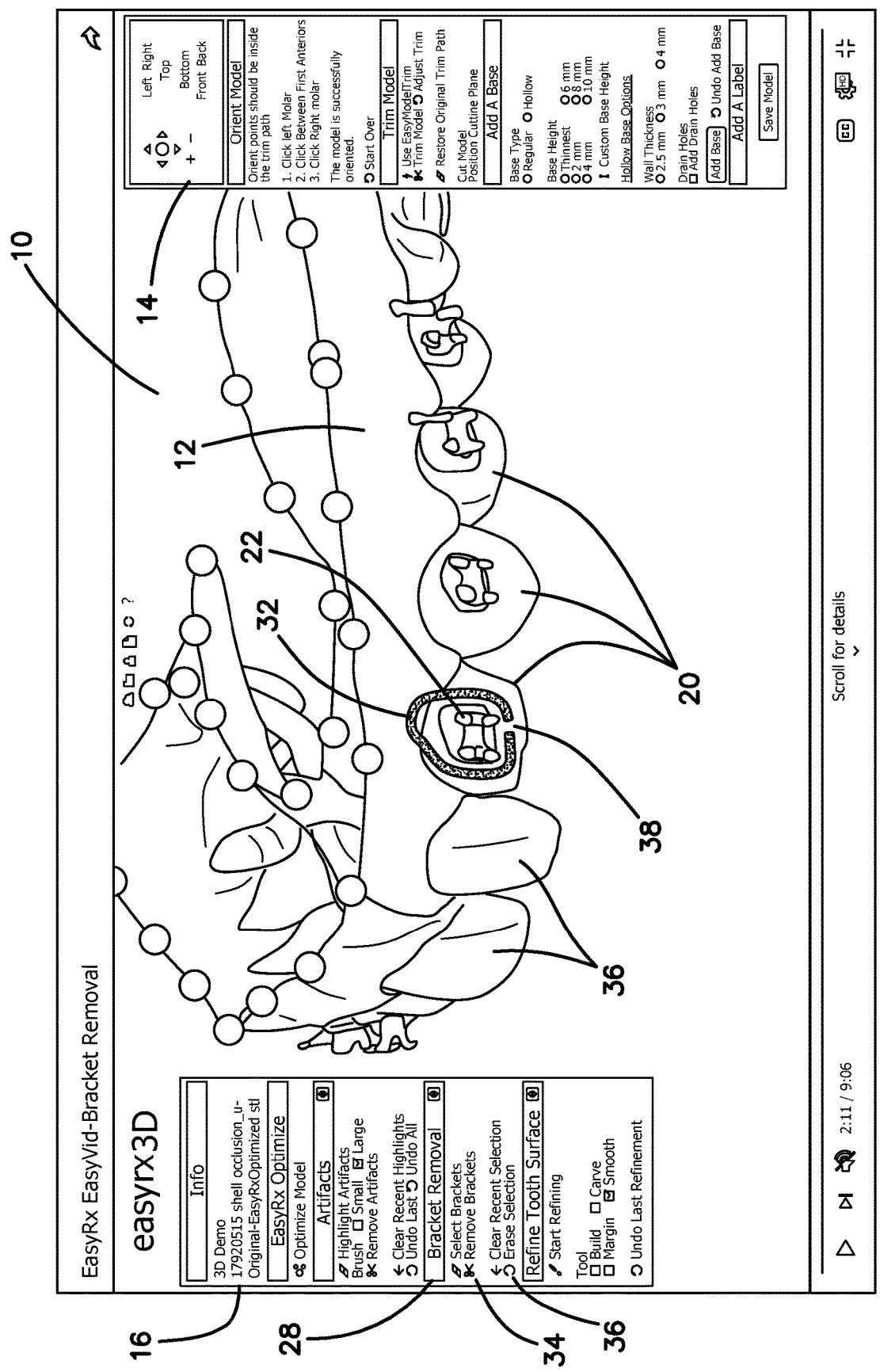
FIG. 5A is an illustration of the bracket removal dashboard after the user has incorrectly outlined a bracket on one of the patient's teeth by leaving a gap within the line generated by the user.
Figure 5B:
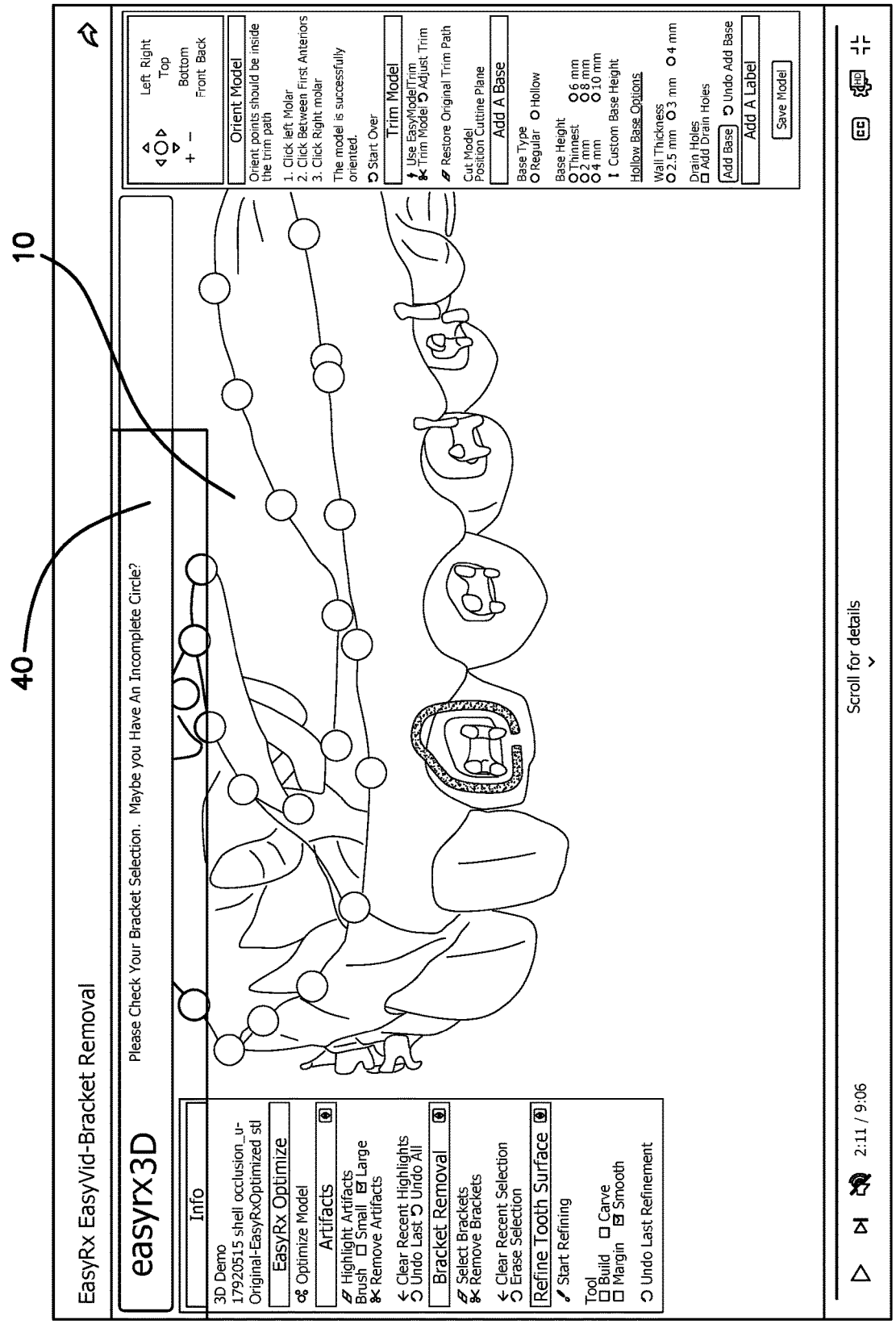
FIG. 5B is an illustration of the bracket removal dashboard seen in FIG. 5A after a notice has been displayed across the bracket removal dashboard informing the user that an incomplete outline around one of the patient's brackets has been detected.

In one embodiment seen in FIGS. 5A and 5B, the bracket removal dashboard 10 comprises the ability to notify the user that an incomplete loop or circle has not been formed by user's line 32. Specifically, if the user traces or draws an outline around a selected bracket 22 with line 32 but inadvertently leaves a gap 38 or otherwise fails to complete a full loop or circle around the selected bracket 22, when the user actuates the Remove Brackets option 34 within the bracket removal tool 28, a notice 40 is displayed across the bracket removal dashboard 10 as seen in FIG. 5B informing the user that there is an error present or that a condition has not yet been fulfilled in order for the selected bracket 22 to be digitally removed. In one embodiment as seen in FIG. 5B, the notice 40 specifically informs that user to check and determine if a complete circle around a selected bracket 22 has been completed with line 32. The user may undo the shape created by the line 32 and then begin re-tracing the line 32 around the bracket 22 from the beginning, or alternatively, may complete the line 32 or fill-in the gap 38 by re-actuating the select brackets 30 tool as discussed above and then continuing to form the line 32 until the gap 38 is eliminated or disappears.

Figure 6:
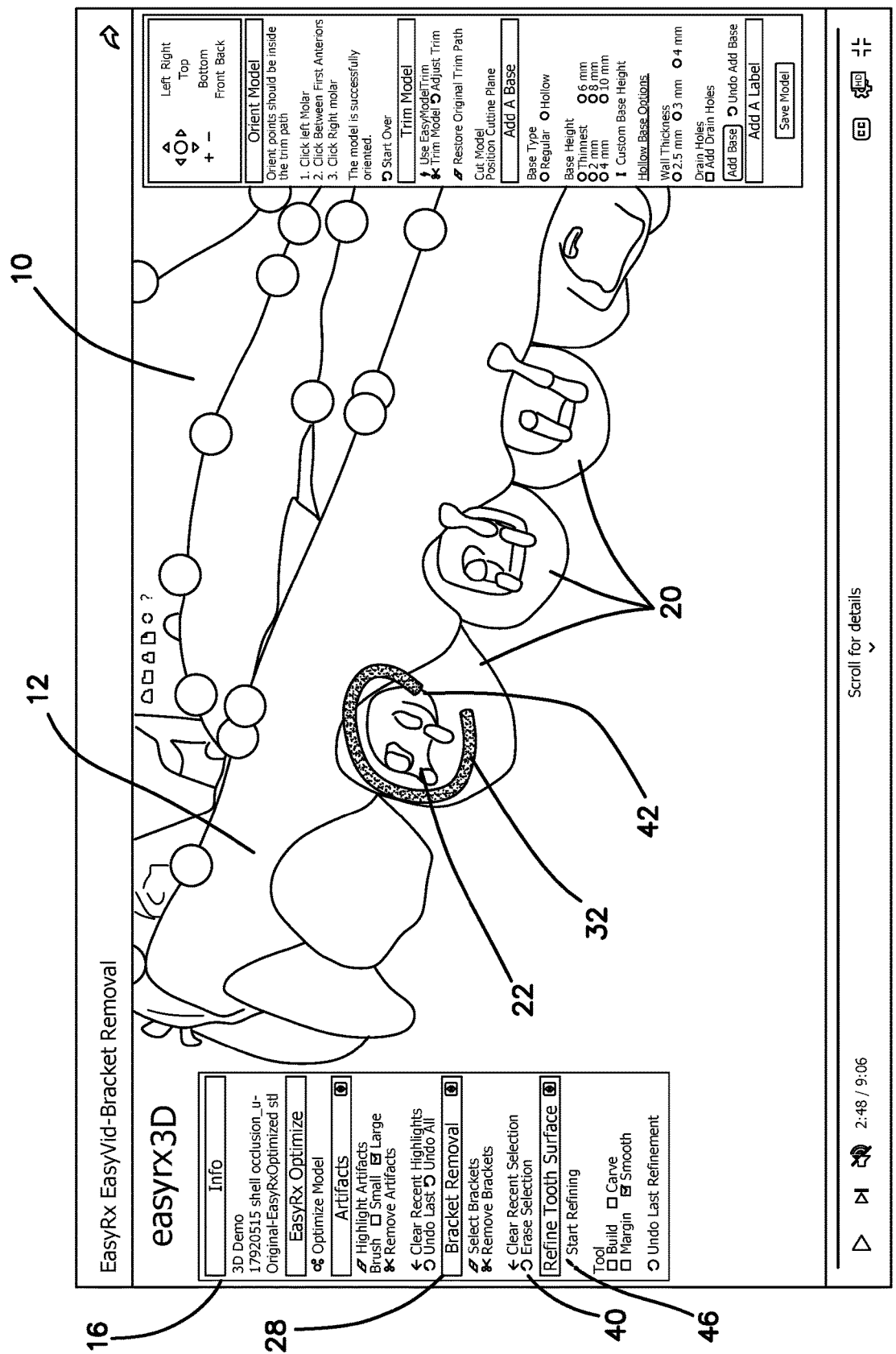
FIG. 6 is an illustration of the bracket removal dashboard seen in FIG. 5A after the user has actuated an erase selection option in order to delete a portion of the user's previously generated outline around one of the patient's brackets.

In a related embodiment seen in FIG. 6, the bracket removal tool 28 further comprises the option to erase or delete any lines 32 which have been previously created by the user. The user actuates the Erase Selection option 36 within the bracket removal tool 28 and then selects a portion of the line 32 they wish to remove or erase. As the user moves over the line 32, an erased portion 42 is created which in effect removes any portion of the line 32 contained therein while leaving the bracket 22 and tooth 20 in place and unchanged. The user may erase the entire line 32, or alternatively, erase only a portion or segment of the line 32 as is needed. For example, if while tracing or outlining the bracket 22 the user misapplies the line 32 onto the bracket 22 itself or otherwise makes an error, the user selects the Erase Selection option 36 and then deletes the portion of the line 32 which has been misapplied. The user then selects the Done Erasing option 40 from the bracket removal tool 28 seen in FIG. 6, thereby allowing the user to return to reapplying the line 32 by reselecting the desired region of the 3D image 12 and continuing to correctly trace the 32 around the bracket 22.

The current invention further provides a refine tooth surface tool 44 within the suite of texture manipulation tools 16. The refine tooth surface tool 44 comprises a plurality of different options for the user to actively select and apply to the surfaces of the teeth 20 within the 3D image 12. Specifically, the refine tooth surface tool 44 comprises a Build option 50, a Carve option 52, a Margin option 54, and a Smooth option 56.

Figure 7:
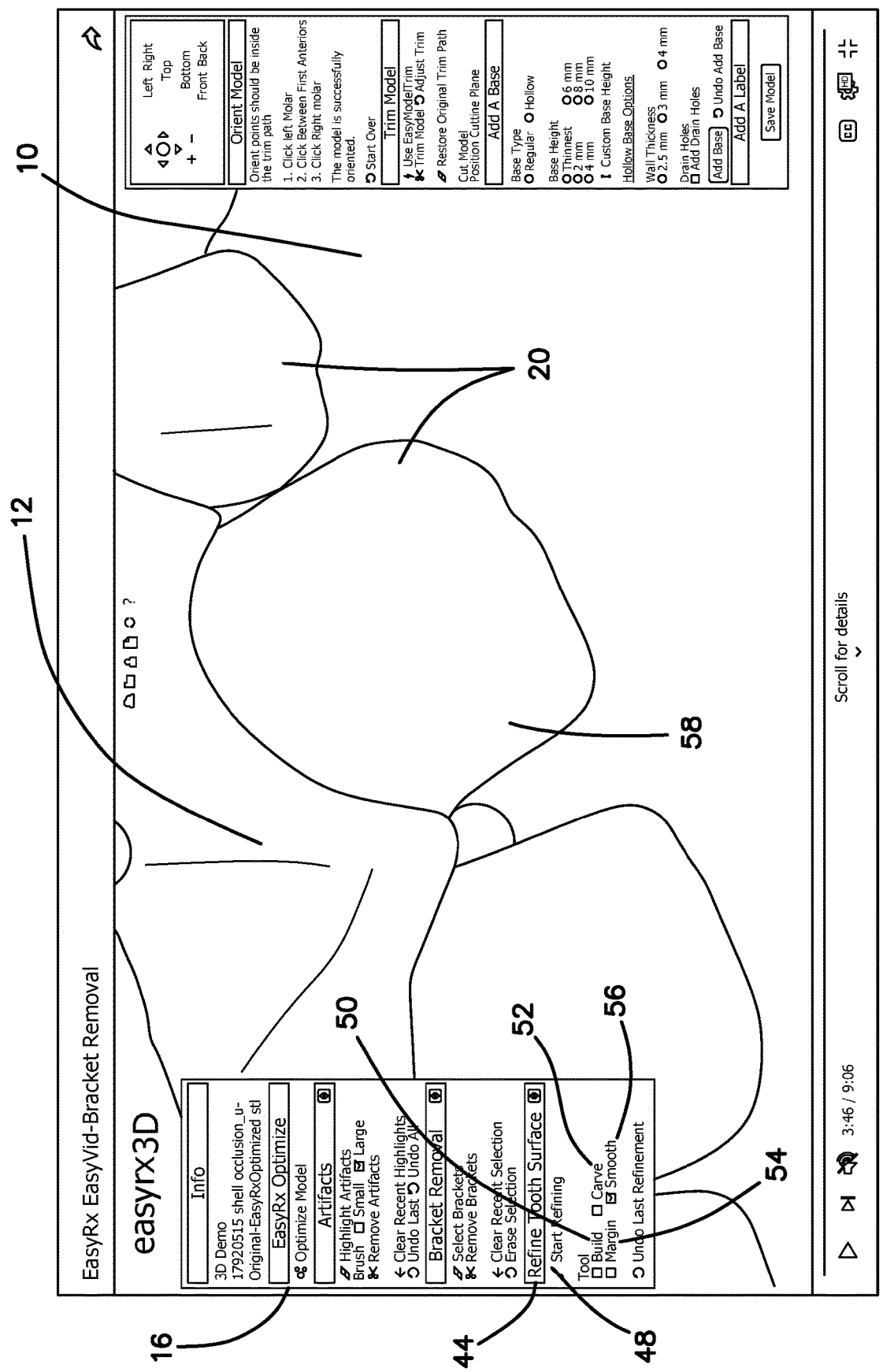
FIG. 7 is an illustration of the bracket removal dashboard displaying a magnified view of one of the patient's teeth after a bracket has been removed from the 3D image.

Use of the Smooth option 56 by the user may be seen in FIG. 7. After removing the bracket 22 from a selected tooth 20 as discussed above, some artifacts or remnants of the bracket 22 may remain on the tooth 20 which may otherwise change or alter the surface of the tooth 20. After selecting the Smooth option 56 the user may then select the artifact or affected area and then engage with the 3D image 12 by repeatedly moving the cursor, their finger, a stylus, or other instrument back and forth over the artifact. The underlying algorithm running the bracket removal dashboard 10 then smooths, flattens, or evens out the surface of the selected tooth 20 to create a corrected or smoothed out portion 58 of the tooth 20.

Figure 8:
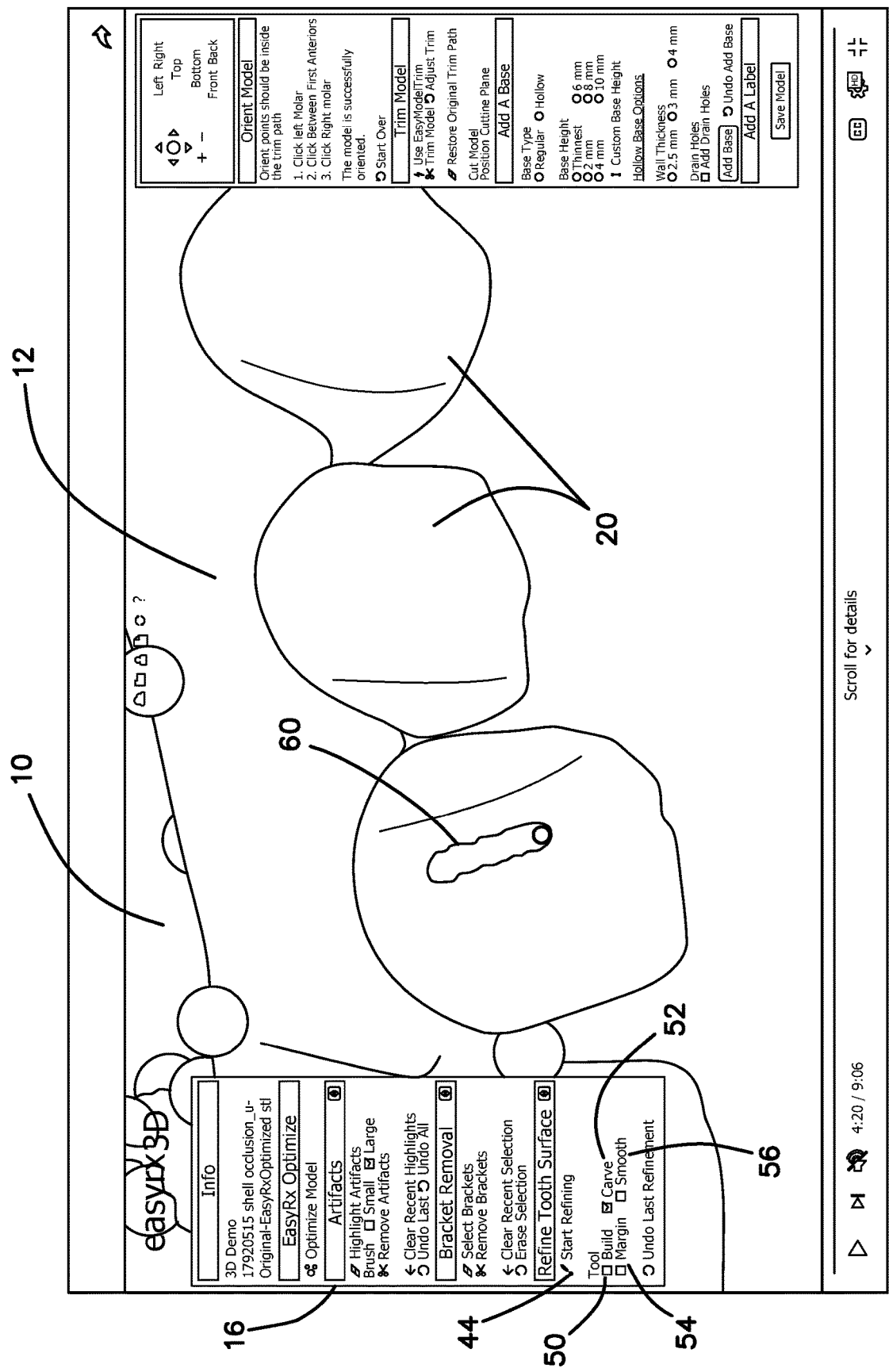
FIG. 8 is an illustration of the bracket removal dashboard displaying a magnified view of one of the patient's teeth after a bracket has been removed from the 3D image.

Use of the Carve option 52 by the user may be seen in FIG. 8. After removing the bracket 22 from a selected tooth 20 as discussed above, the user may wish to carve away or otherwise remove at least a portion of the surface of the tooth 20. After selecting the Carve option 52 the user may then select a portion of the surface of a preferred tooth 20 and then engage with the 3D image 12 by moving the cursor, their finger, or a stylus in the direction where a portion of the tooth's surface is to be shaved, carved, or otherwise corrected. The underlying algorithm running the bracket removal dashboard 10 then creates a carved-out or defined trough 60 on the surface of the tooth 20 which corresponds exactly to where the user has moved their cursor, finger, or stylus over the 3D image 12.

Figure 9:
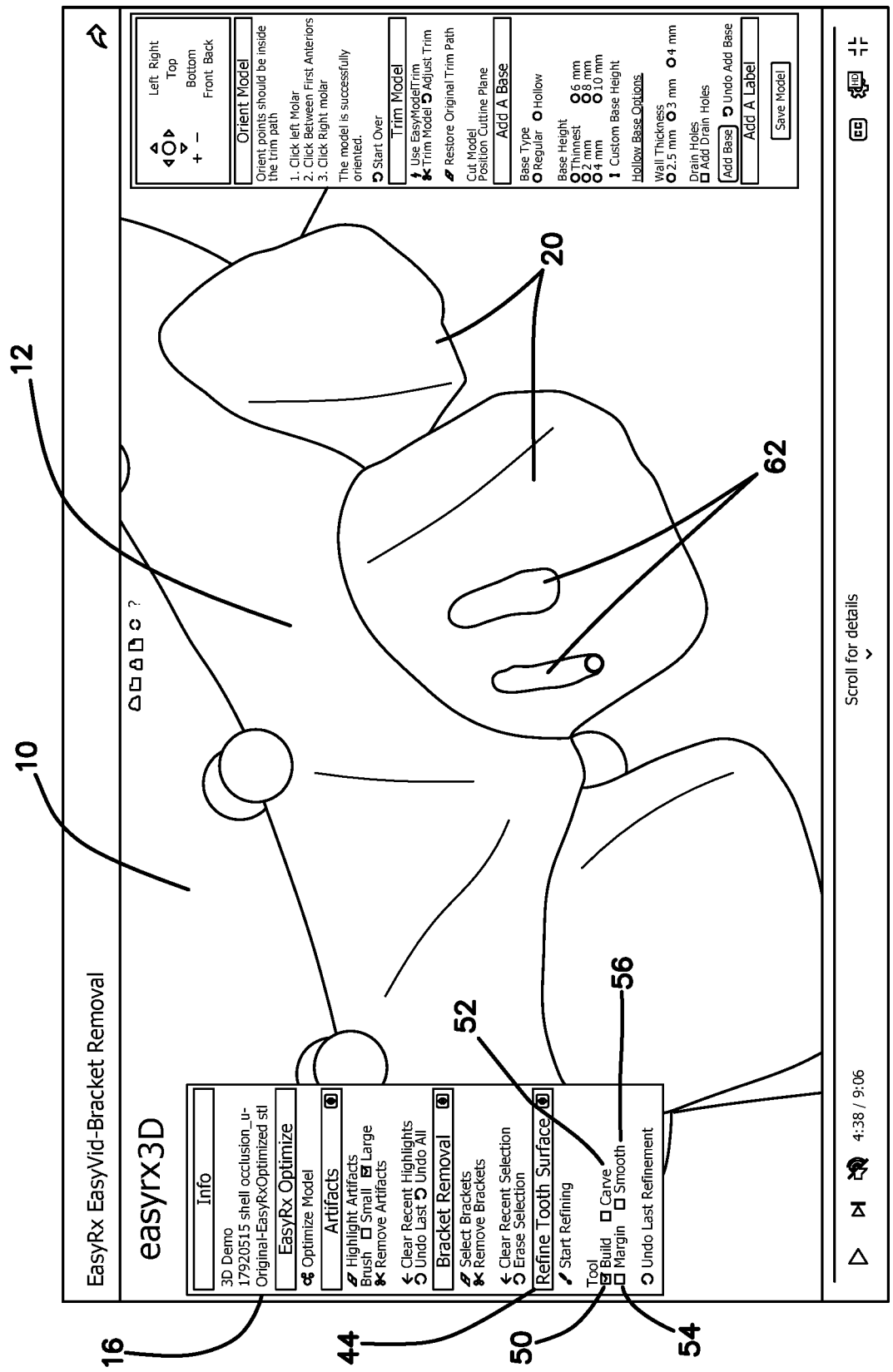
FIG. 9 is an illustration of the bracket removal dashboard displaying a magnified view of one of the patient's teeth after a bracket has been removed from the 3D image.

Use of the Build option 50 by the user may also be seen in FIG. 9. After removing the bracket 22 from a selected tooth 20 as discussed above, the user may wish to add, supplement, or otherwise build upon the surface of the tooth 20. After selecting the Build option 50 the user may then move the cursor, their finger, or stylus over the selected portion of the surface of a preferred tooth 20 and then engage with the 3D image 12 by moving their cursor, finger, or stylus in the direction where a portion of the tooth's surface is to be supplemented or built upon. The underlying algorithm running the bracket removal dashboard 10 then creates a ridge or mound 62 on the surface of the tooth 20 which corresponds exactly to where the user has moved the cursor over the 3D image 12.

Figure 10:
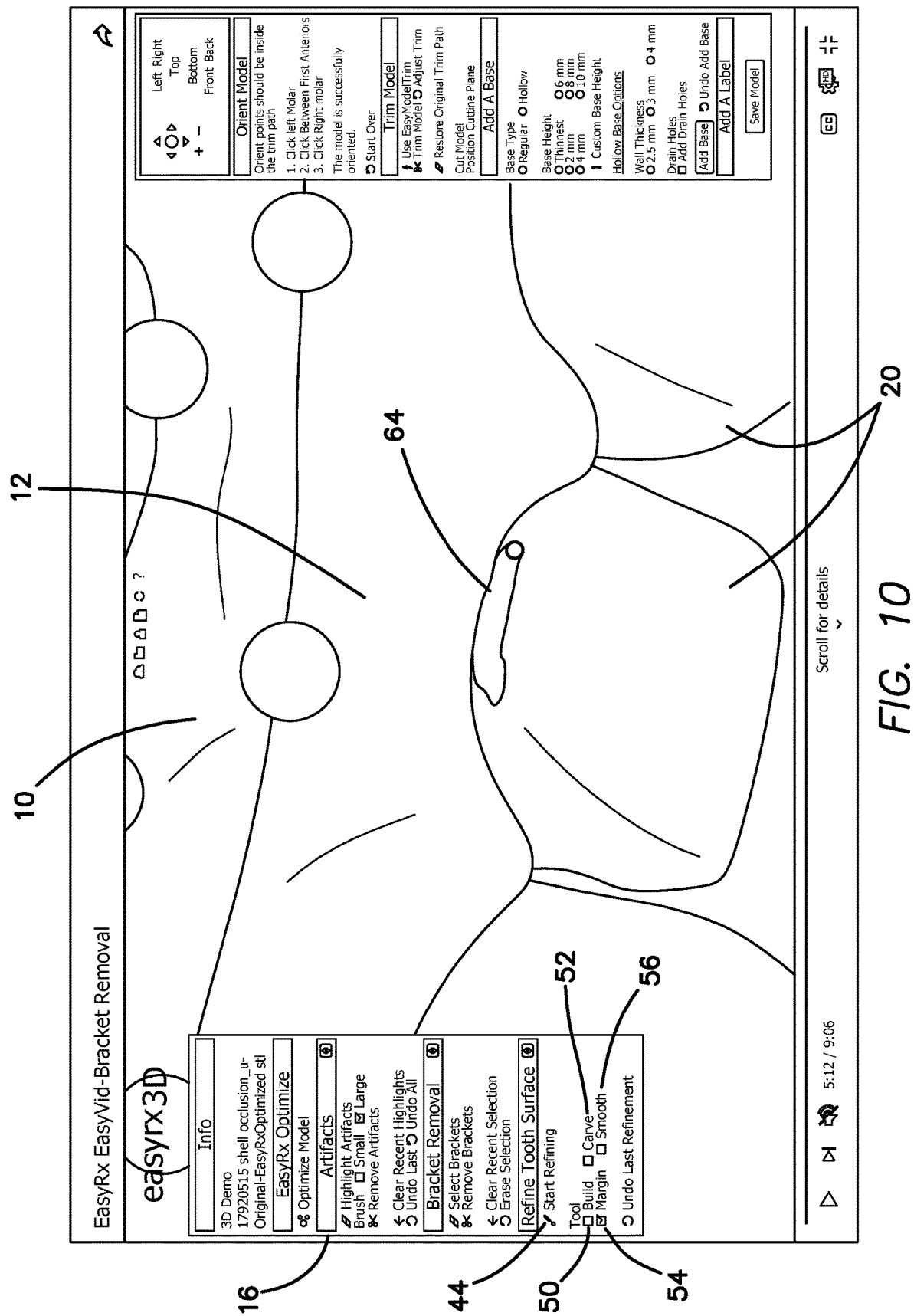
FIG. 10 is an illustration of the bracket removal dashboard displaying a magnified view of one of the patient's teeth after a bracket has been removed from the 3D image.

Use of the Margin option 54 by the user may be seen in FIG. 10. After removing the bracket 22 from a selected tooth 20 as discussed above, the user may wish to further define, correct, or otherwise change or alter the surface between a tooth 20 and its corresponding gum line, also known as the gingiva margin. After selecting the Margin option 54 the user may then move the cursor, their finger, or a stylus over the selected intersection between the surfaces of a selected tooth 20 its corresponding gum line and then engage with the 3D image 12 by moving their cursor, finger, or stylus in the direction where further definition or a correction is needed. The underlying algorithm running the bracket removal dashboard 10 then creates a definition 64 between the surface of the tooth 20 and the gum line which corresponds exactly to where the user has moved the cursor, finger, or stylus over the 3D image 12 as seen in the magnified view of FIG. 10.

Figure 13:
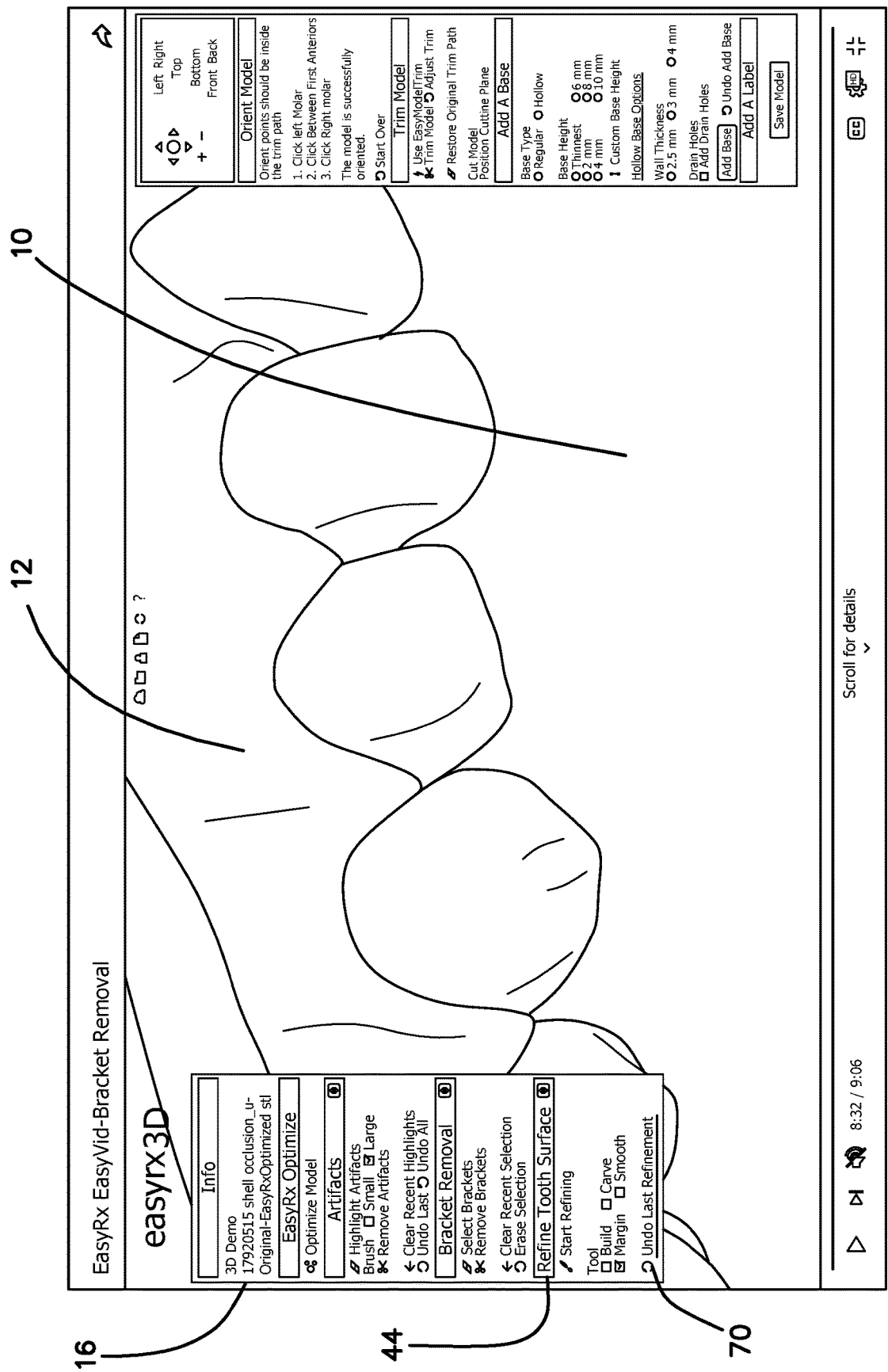
FIG. 13 is an illustration of the bracket removal dashboard displaying an undo last refinement option to the user.

As seen in FIG. 13, at any point during use of any of the options 50-56 within the refine tooth surface tool 44, the user may select an Undo Last Refinement option 70 which, when actuated, automatically removes whatever the last change was made to the 3D image 12. The user may actuate the Undo Last Refinement option 70 several times, each time removing the previous alteration made in sequence to the 3D image 12 through any of the options disposed within the refine tooth surface tool 44.

By using the plurality of options 50-56 within the refine tooth surface tool 44, namely the Build option 50, the Carve option 52, the Margin option 54, and the Smooth option 56, it can be seen that the user may correct or improve the overall quality of the 3D image, thereby making it easier to apply new or different orthodontic appliances to the patient's prescription after the original brackets 22 have been removed. The user may use a plurality of different options 50-56 in conjunction together or in sequence to obtain a 3D image 12 which is as close as is possible to a true representation of the patient's teeth. In other words, the refine surface tool 44 provides the user the ability to correct deficiencies which are left behind after the brackets 22 are removed from the 3D image, which if left otherwise uncorrected, would require the patient to possibly undergo a subsequent intraoral scan.

Figure 11:
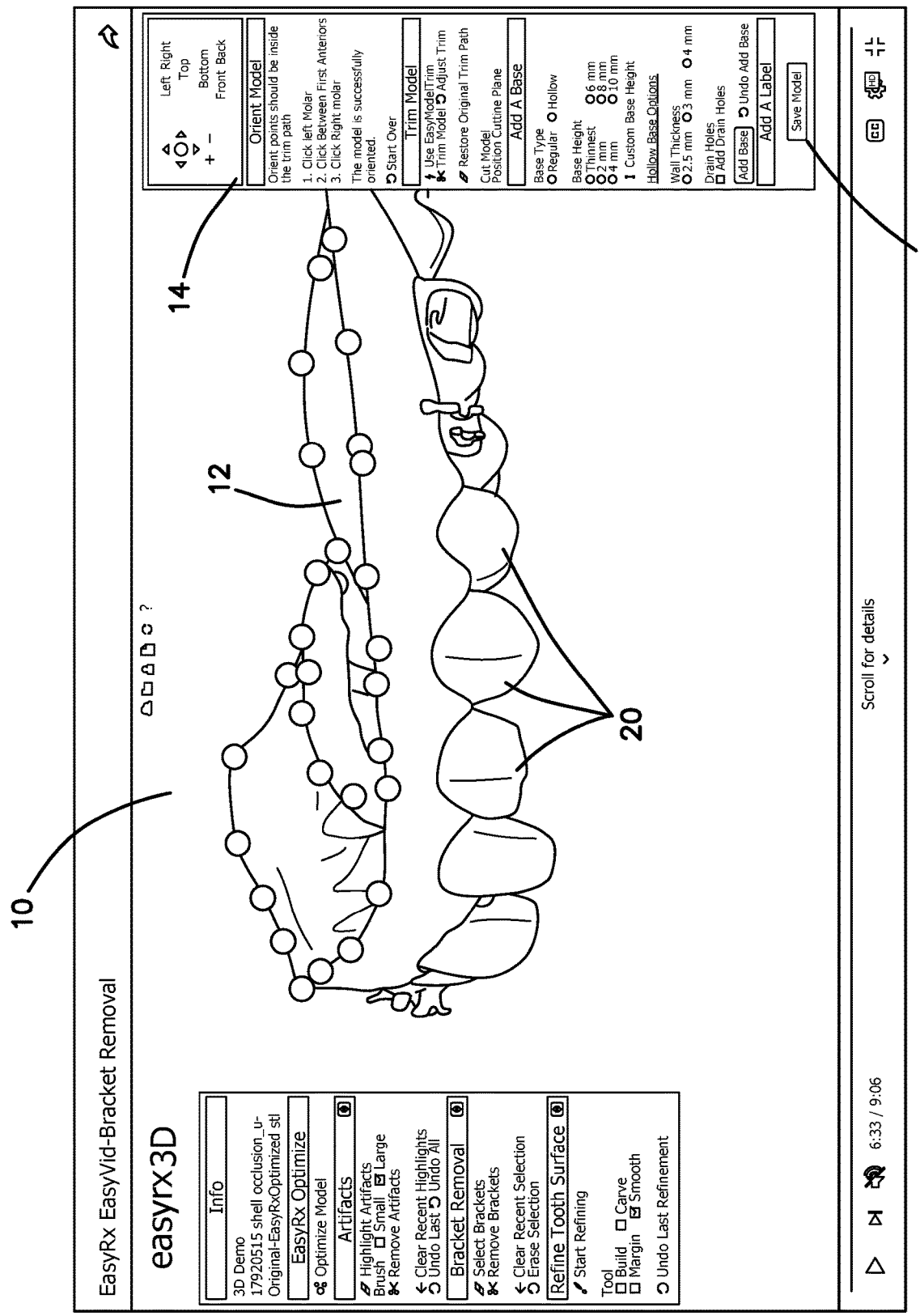
FIG. 11 is an illustration of the bracket removal dashboard displaying a save button allowing the user to save any changes made to the 3D image.

At any point during the process of removing brackets 22 from the 3D image 12 or correcting or altering the 3D image 12 using the refine surface tool 44, the user may stop and save their progress by actuating a save button 66 seen in FIG. 11. The user may then save the current state of the 3D image 12 as a file and store it within a list or database 68 seen in FIG. 12 so that it may be easily retrieved later.

It should also be noted that while the drawings and the above description relate to using the refine surface tool 44 for removing one or more brackets 22, it also expressly contemplated that other orthodontic appliances including bands, wires, and/or attachments may also be removed from the 3D image 12 using the bracket removal dashboard 10.

Figure 14:
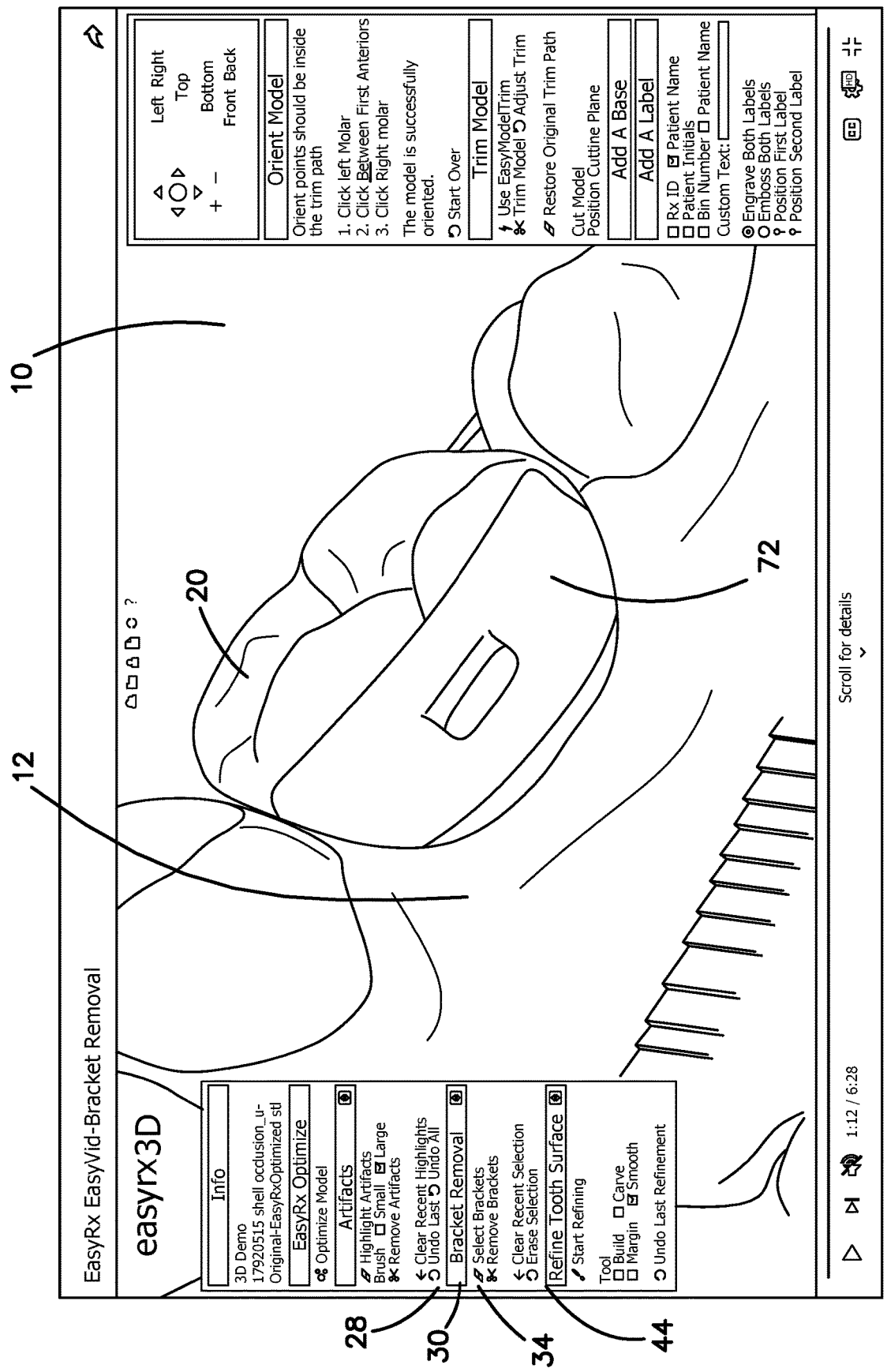
FIG. 14 is an illustration of the bracket removal dashboard displaying a magnified view of a 3D image depicting a band disposed on a lingual side of the patient's teeth.
Figure 15A:
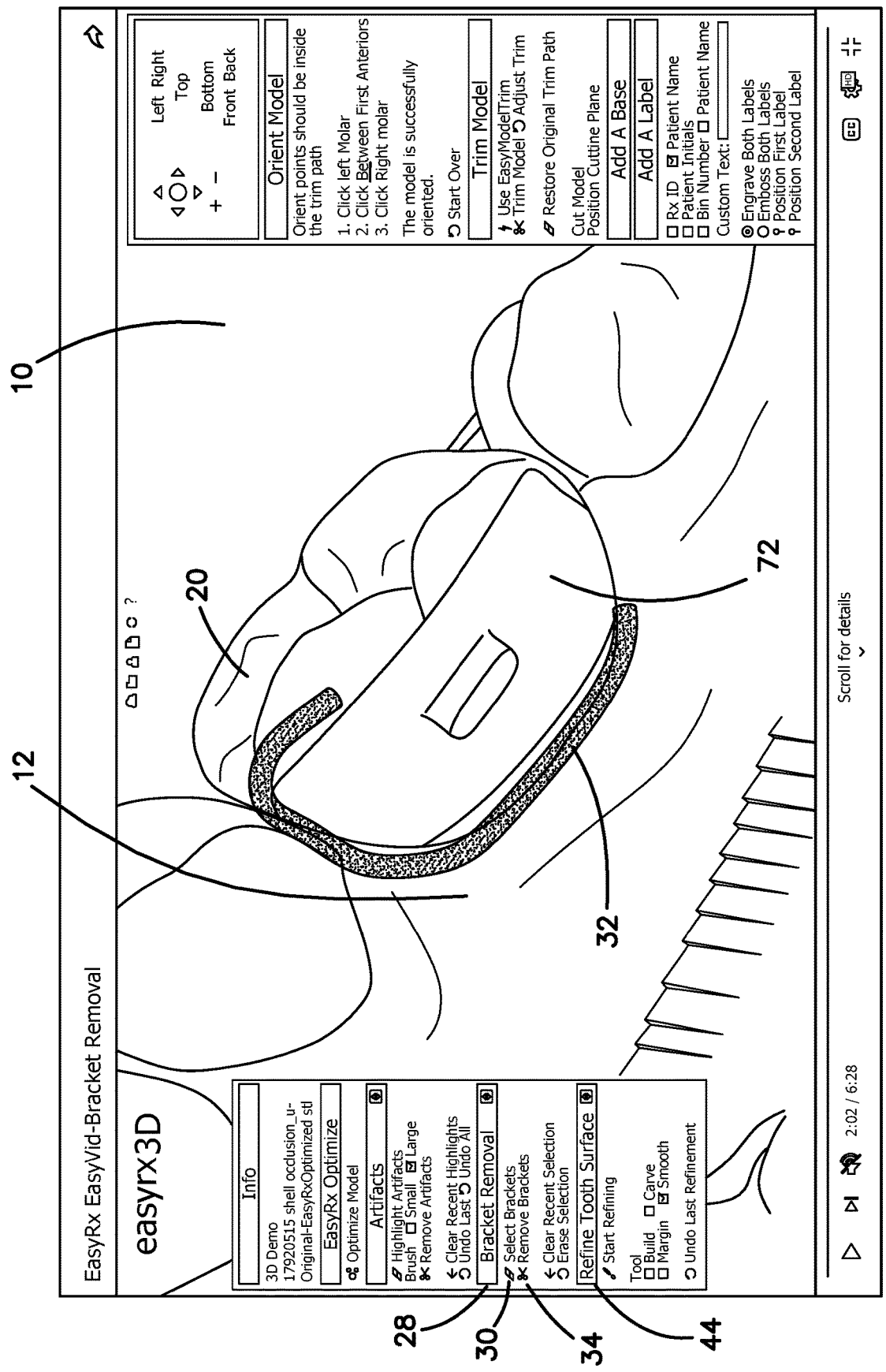
FIG. 15A is an illustration of the bracket removal dashboard seen in FIG. 14 after the user has begun to outline the band disposed on one of the patient's teeth after actuating the select brackets option provided by the current invention.
Figure 15B:
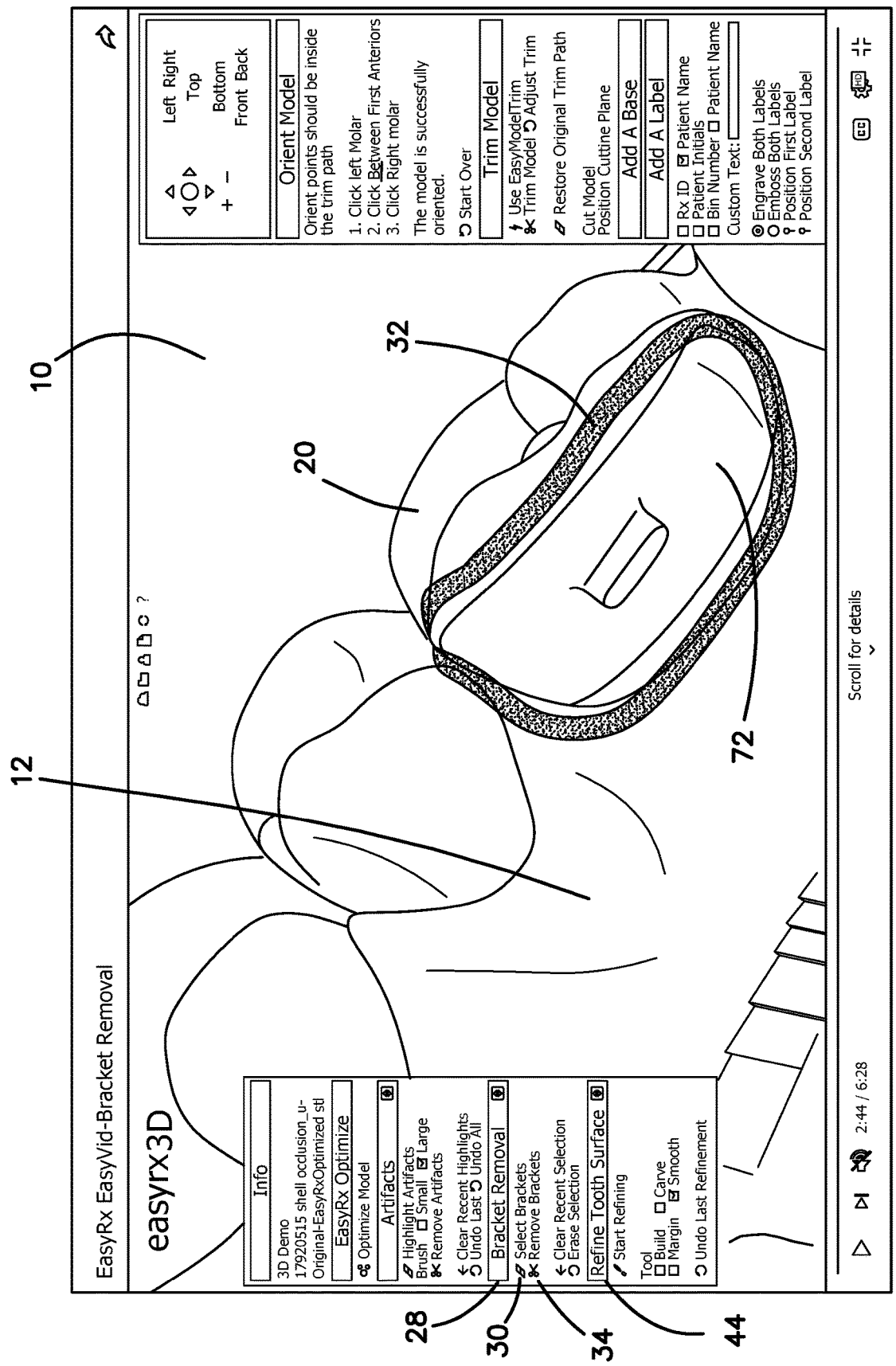
FIG. 15B is an illustration of the bracket removal dashboard seen in FIG. 15A after the user has completed outlining the band using the bracket removal tool provided by the current invention.
Figure 16A:
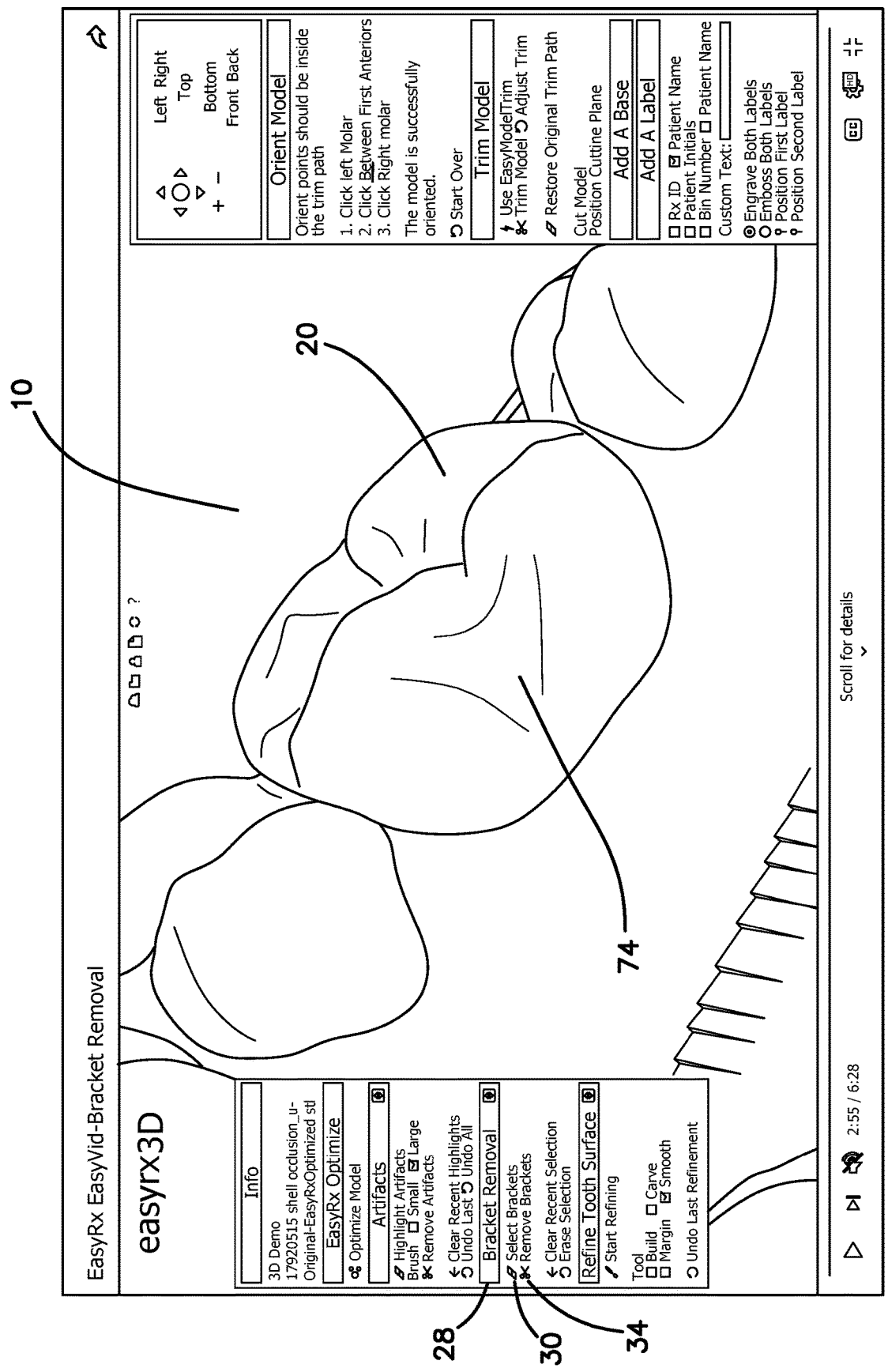
FIG. 16A is an illustration of the bracket removal dashboard seen in FIG. 15B after the user has actuated the remove brackets option provided by the current invention to remove the band.
Figure 16B:
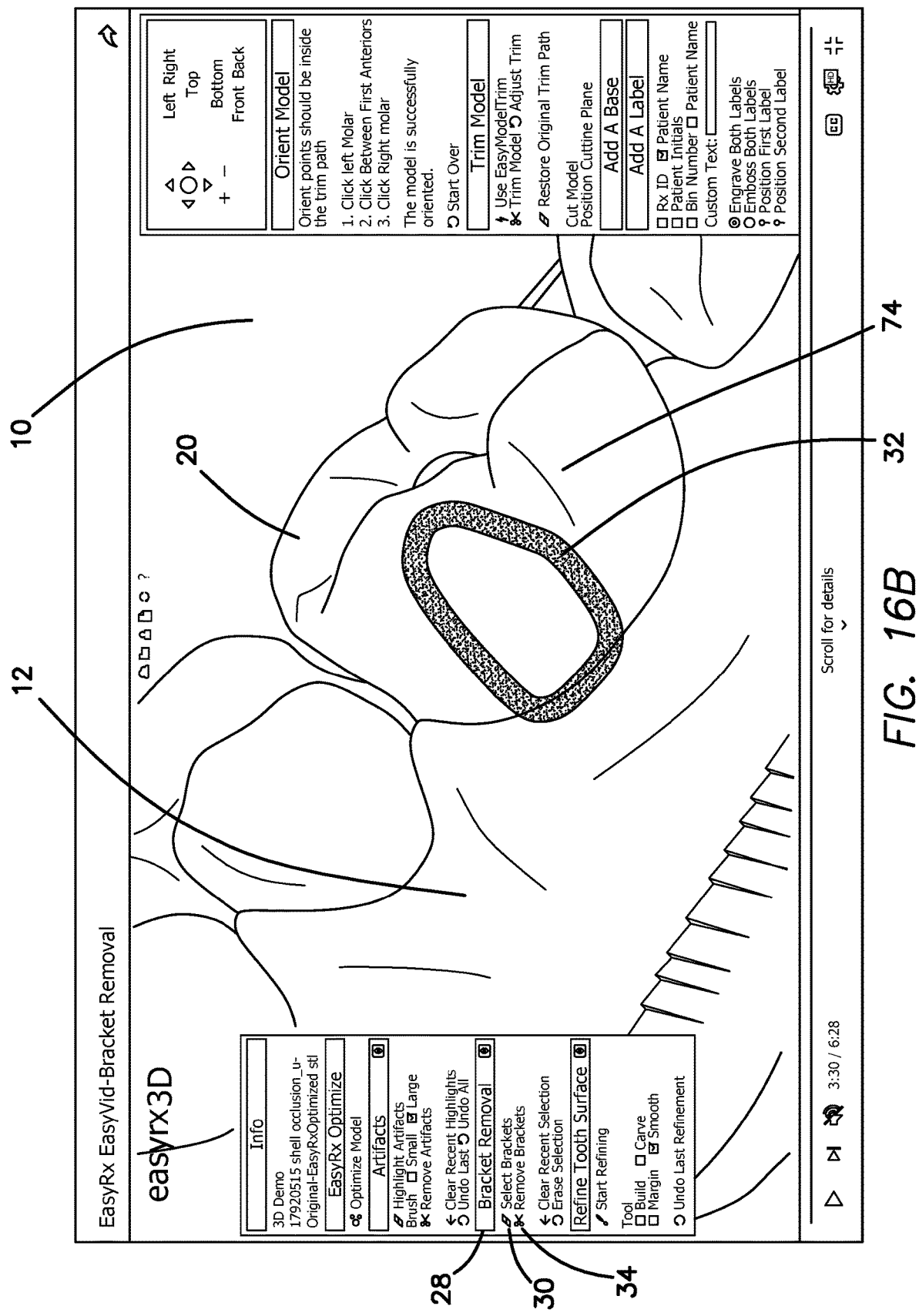
FIG. 16B is an illustration of the bracket removal dashboard seen in FIG. 16A after the user has begun to outline a leftover portion of the band disposed on one of the patient's teeth after actuating the select brackets option provided by the current invention.

For example, use of the bracket removal dashboard 10 to remove a band 72 may be seen in FIGS. 14-17. After orientating the 3D image 12 in the same manner discussed above, the user zooms in or magnifies a tooth 20 within the 3D image 12 which comprises a band 72 disposed on its lingual side as seen in FIG. 14. The user then selects the Select Brackets option 30 within the bracket removal tool 28 and then in FIG. 15A begins to draw a line 32 around the outer perimeter of the band 72 until a complete circle is formed around the band 72 (FIG. 15B). Next, the user actuates the Remove Brackets option 34 from the bracket removal tool 28 which, in the same manner discussed above with regard to the removal of a bracket 22, causes the algorithm underlying the bracket removal dashboard 10 to remove the image data contained within the circle formed by the line 32 and produce a tooth surface 74 seen in FIG. 16A which no longer contains the band 72.

More specifically, the algorithm, using the location of the loop or circle as defined by the line 32 drawn by the user, removes the band 72 within the circle and calculates what the surface of the tooth 20 most likely looks like under the band 72, and re-creates that tooth surface 20 in the 3D image 12. In other words, the algorithm calculates the curvature of the tooth 20 to get the "new" surface of the tooth 20 as close as possible to the true shape of the patient's tooth. Without the algorithmic estimation and re-creation of the surface of the tooth 20, simply deleting the band 72 from the 3D image 12 would result in creating a hole or a flat surface on the tooth 20 where the band 72 was previously located, thereby requiring the user to do much more refining to get the surface of the tooth 20 correct.

Figure 17:
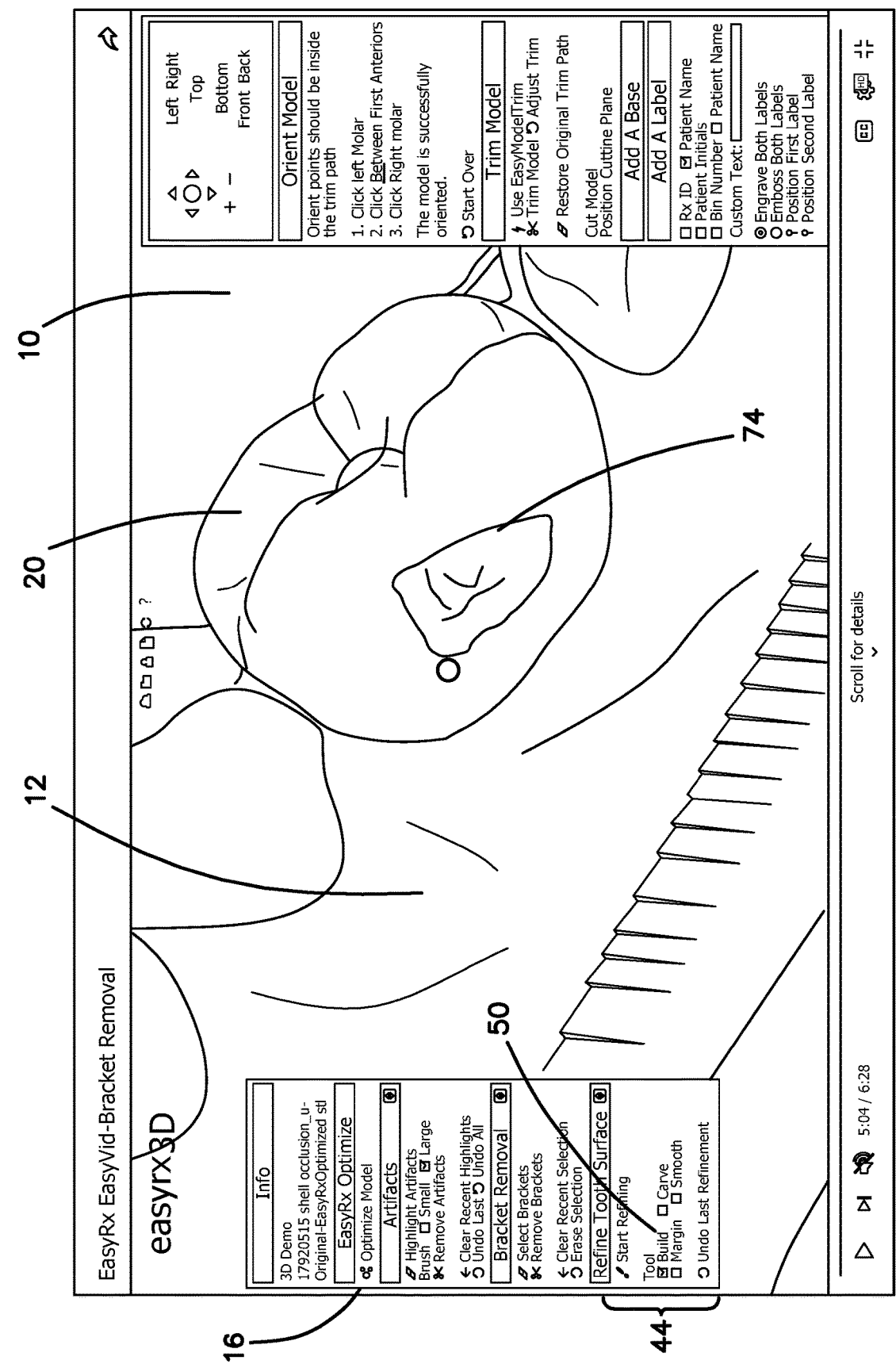
FIG. 17 is an illustration of the bracket removal dashboard displaying a magnified view of one of the patient's teeth after a band has been removed from the 3D image.

The user further has the option to remove any artifacts or residual effects from the band 72 by again selecting the Select Brackets option 30, drawing another loop or circle with a second line 32 seen in FIG. 16B, and then once again selecting the Remove Brackets option 34 which further improves or removes any leftover portions of the band 72 from the tooth surface 74. Turning to FIG. 17, the user may further refine or adjust the tooth surface 74 as needed using the refine tooth surface tool 44 including the Build option 50, Carve option 52, Margin option 54, or Smooth option 56, or a combination thereof.

Figure 18:
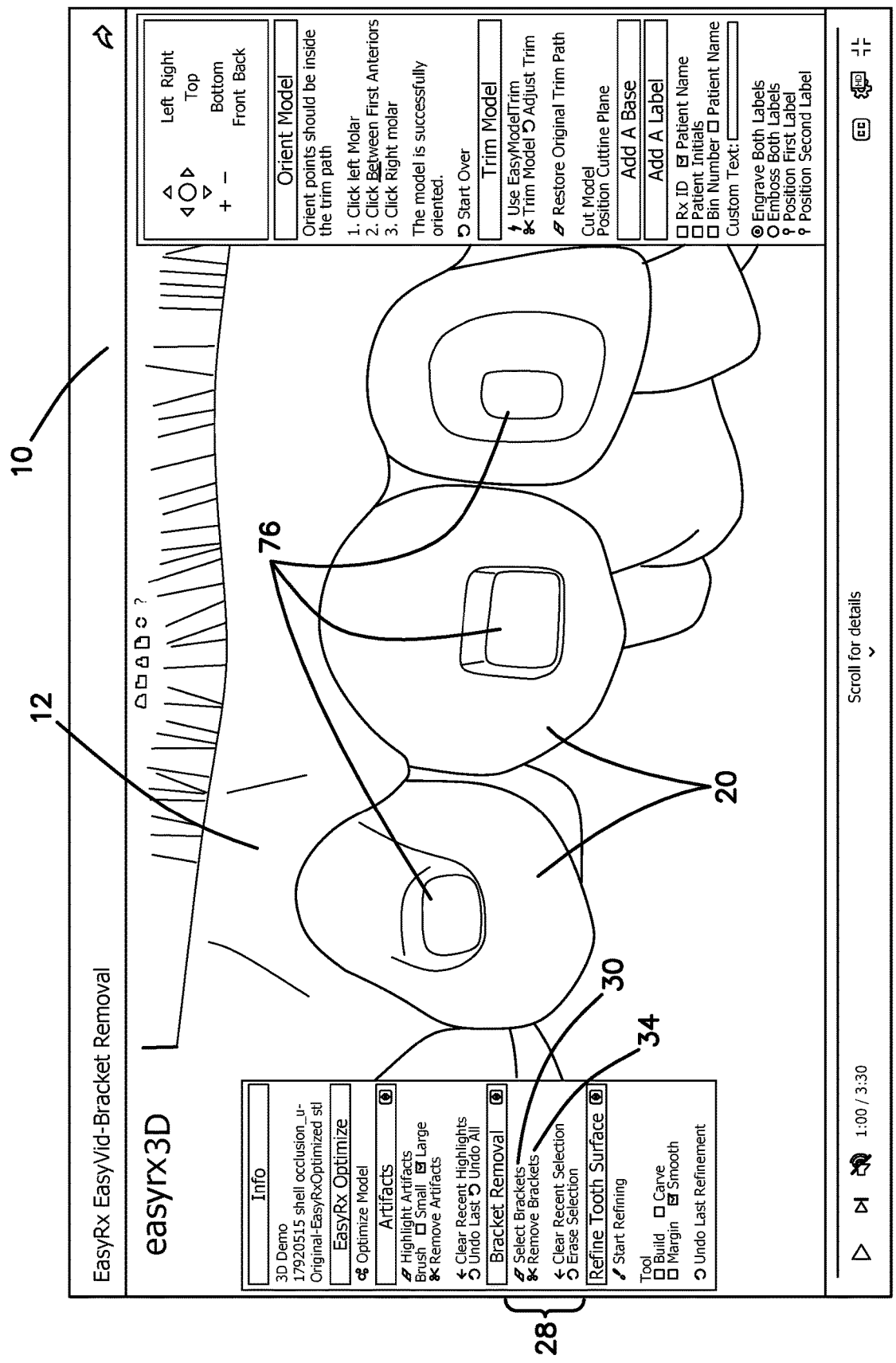
FIG. 18 is an illustration of the bracket removal dashboard displaying a magnified view of a 3D image depicting a plurality of attachments disposed on a buccal side of the patient's teeth.
Figure 19:
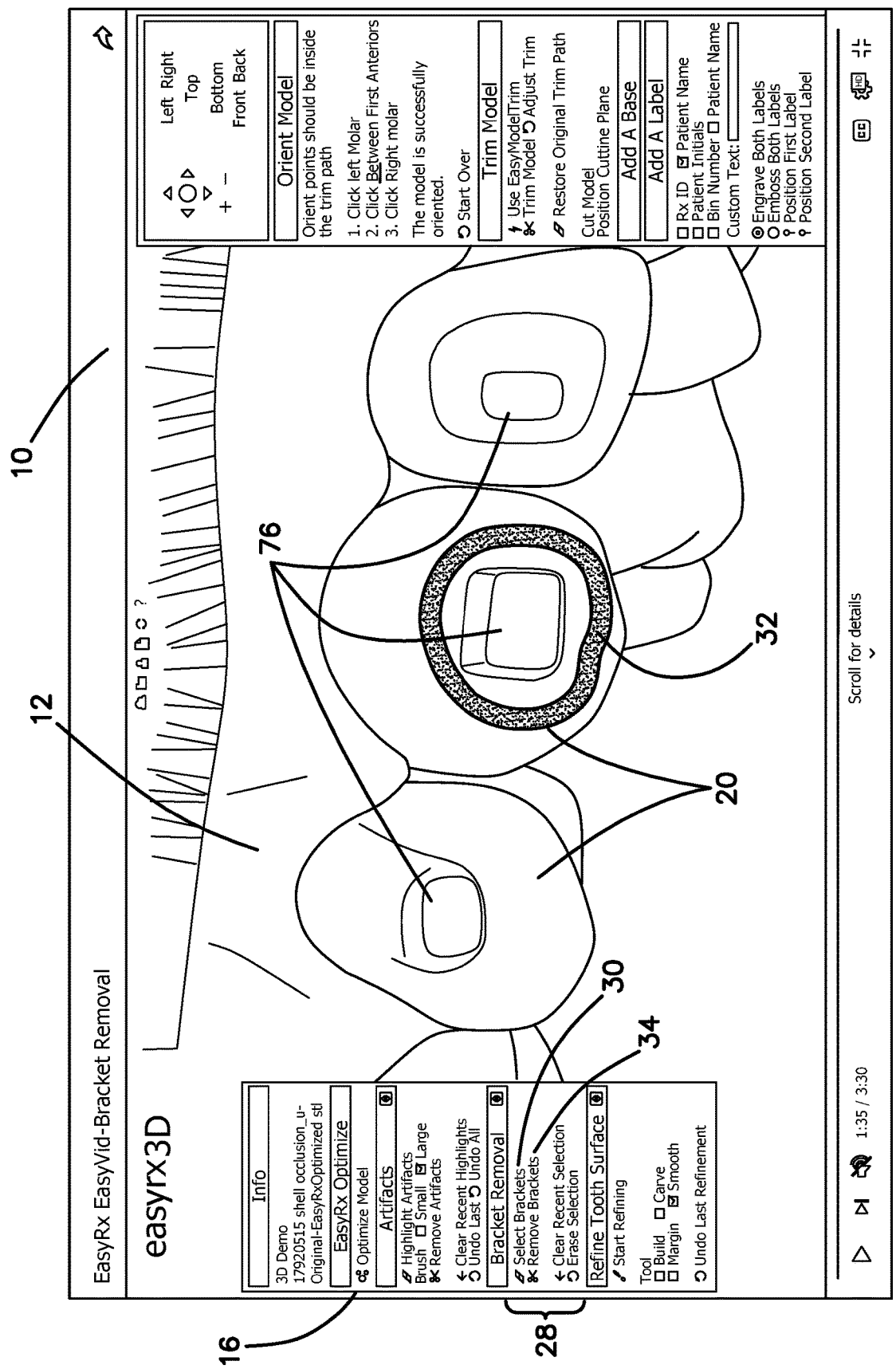
FIG. 19 is an illustration of the bracket removal dashboard seen in FIG. 18 after the user has begun to outline one of the plurality of attachments disposed on one of the patient's teeth after actuating the select brackets option provided by the current invention.
Figure 20:
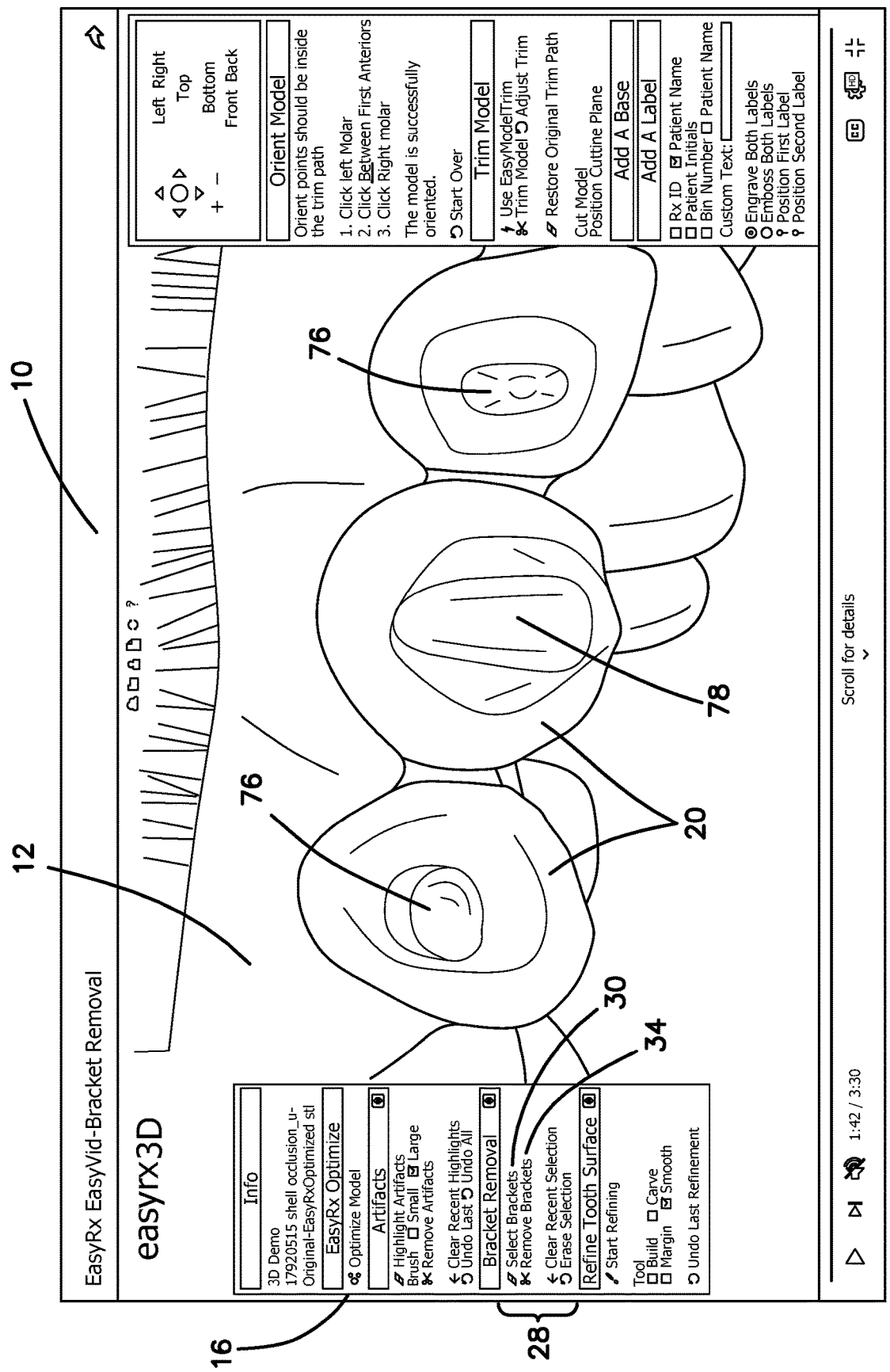
FIG. 20 is an illustration of the bracket removal dashboard seen in FIG. 19 after the user has actuated the remove brackets option provided by the current invention to remove the attachment.

In yet another embodiment, the bracket removal dashboard 10 may be used to remove an attachment 76 which may be seen in FIGS. 18-21. After orientating the 3D image 12 in the same manner discussed above, the user zooms in or magnifies a tooth or teeth 20 within the 3D image 12 which comprises an attachment 76 disposed on their respective buccal sides as seen in FIG. 18. The user then selects the Select Brackets option 30 within the bracket removal tool 28 and then in FIG. 19 begins to draw a line 32 around the outer perimeter of the attachment 76 until a complete circle is formed around the attachment 76 as best seen in FIG. 19. Next, the user actuates the Remove Brackets option 34 from the bracket removal tool 28 which, in the same manner discussed above with regard to the removal of a bracket 22, causes the algorithm underlying the bracket removal dashboard 10 to remove the image data contained within the circle formed by the line 32 and produce a tooth surface 78 seen in FIG. 20 which no longer contains the attachment 76.

More specifically, the algorithm, using the location of the loop or circle as defined by the line 32 drawn by the user, removes the attachment 76 within the circle and calculates what the surface of the tooth 20 most likely looks like under the attachment 76, and re-creates that tooth surface 20 in the 3D image 12. In other words, the algorithm calculates the curvature of the tooth 20 to get the "new" surface of the tooth 20 as close as possible to the true shape of the patient's tooth. Without the algorithmic estimation and re-creation of the surface of the tooth 20, simply deleting the bracket 22 from the 3D image 12 would result in creating a hole or a flat surface on the tooth 20 where the attachment 76 was previously located, thereby requiring the user to do much more refining to get the surface of the tooth 20 correct.

Figure 21:
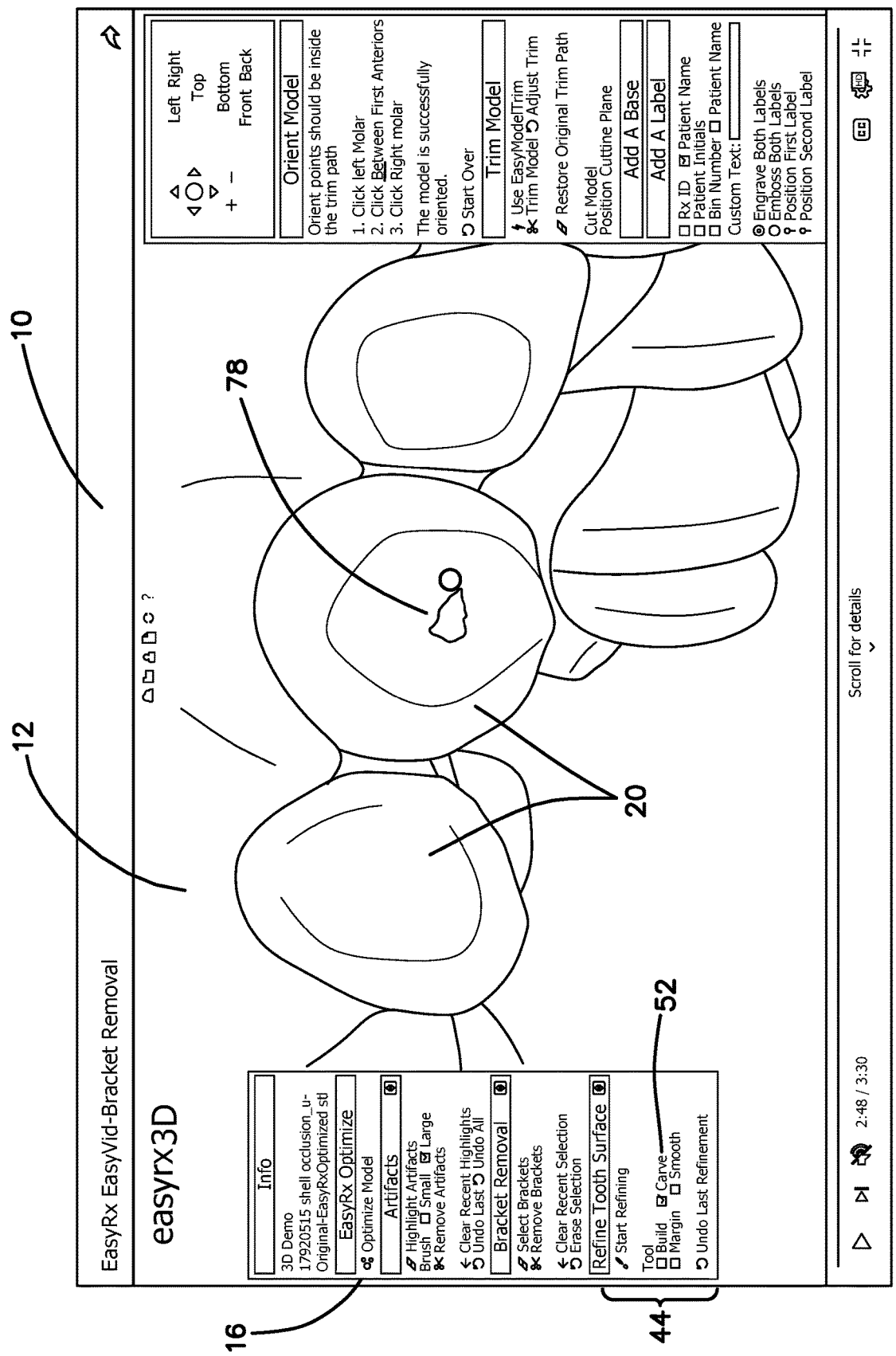
FIG. 21 is an illustration of the bracket removal dashboard displaying a magnified view of one of the patient's teeth after an attachment has been removed from the 3D image.

The user may then repeat the removal process for additional teeth 20 within the 3D image 12 which also comprise an attachment 76. Turning to FIG. 21, the user may further refine or adjust the tooth surface 78 as needed using the refine tooth surface tool 44 including the Build option 50, Carve option 52, Margin option 54, or Smooth option 56, or a combination thereof.

In a further embodiment, the bracket removal dashboard 10 may be used to remove wires interconnecting the brackets 22. Specifically, in a manner similar to what is discussed above, after acquiring a 3D image 12 comprising orthodontic wires, the user uses the Select Brackets option 30 to encircle or draw a line 32 around the wires and then remove the image information related to the wires by selecting the Remove Brackets option 34. The user may further alter or correct the 3D image 12 using any of the options 50-54 within the refine tooth surface tool 44 as discussed above. By supporting a 3D image 12 with or without the wire allows the bracket removal dashboard 10 to support two workflows, namely scanning the patient with the wires in or scanning the patient with the wires removed.

One of the advantageous features of the illustrated embodiment of the system is that digital three-dimensional model files are viewed using the disclosed software system from inside of a browser without installing any local software. There is no need to download software to view three dimensional models. Whether the image file is from an intra-oral scanner, cone-beam or from a digital study model service from a lab, the illustrated system provides a fast and efficient solution to view the files.

Once editing of the 3D image 12 has been completed by removing all the previously scanned brackets, bands, or attachments, the user then free to use the now appliance-free 3D image to create a new or different prescription for the patient by applying new set of brackets, bands, or attachments. Once applied, the user may send the revised 3D image to a lab where the corresponding attachments may be manufactured and then returned to the user who may then apply them to the patient.

The illustrated embodiments of the system and method can now be understood as an overall bracket removal system and method designed to efficiently and easily remove orthodontic or dental appliances from an image of an intraoral scan, allowing doctors and other users access to review and update the prescriptions of their patients. The system allows for flexibility to make customizations based on the particular lab using the system. Since this is a web-based system, updates can be made on the fly and the doctors' data is stored via the cloud.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. A method for removing image data corresponding to an orthodontic or dental appliance from a 3D image of a patient's teeth comprising:
    selecting an image data corresponding to at least one appliance to be removed from the 3D image;
    deleting the selected image data corresponding to the at least one appliance from the 3D image;
    calculating image data corresponding to a surface of a tooth disposed beneath the deleted image data corresponding to the at least one appliance;
    integrating the calculated image data corresponding to the surface of the tooth disposed beneath the deleted image data corresponding to the at least one appliance with the remaining portion of the 3D image; and
    refining the image data corresponding to the surface of the tooth disposed beneath the deleted image data corresponding to the at least one appliance,
    wherein selecting the image data corresponding to the at least one appliance comprises forming a boundary within the 3D image around the image data corresponding to the at least one appliance, and
    wherein deleting the selected image data corresponding to the at least one appliance from the 3D image comprises deleting the image data corresponding to the at least one appliance contained within the formed boundary, and wherein refining the image data corresponding to the surface of the tooth disposed beneath the deleted image data corresponding to the at least one appliance comprises removing at least a portion of the image data corresponding to the surface of the tooth disposed beneath the deleted image data corresponding to the at least one appliance.

2. The method of claim 1 wherein forming a boundary within the 3D image around the image data corresponding to the at least one appliance comprises encircling the image data corresponding to the at least one appliance with a line defined by a user.

3. The method of claim 2 wherein encircling the image data corresponding to the at least one appliance with a line defined by the user comprises:
   determining when an incomplete boundary around the image data corresponding to the at least one appliance is present; and
   notifying the user when the incomplete boundary around the image data corresponding to the at least one appliance has been detected.

4. The method of claim 2 wherein forming the boundary within the 3D image around the image data corresponding to the at least one appliance comprises erasing at least a portion of the boundary created within the 3D image around the image data corresponding to the at least one appliance.

5. The method of claim 1 wherein refining the image data corresponding to the surface of the tooth disposed beneath the deleted image data corresponding to the at least one appliance comprises adding to at least a portion of the image data corresponding to the surface of the tooth disposed beneath the deleted image data corresponding to the at least one appliance.

6. The method of claim 1 wherein refining the image data corresponding to the surface of the tooth disposed beneath the deleted image data corresponding to the at least one appliance comprises defining an intersection between the image data corresponding to the surface of the tooth disposed beneath the deleted image data corresponding to the at least one appliance and image data corresponding to a gingiva margin of the patient within the 3D image.

7. The method of claim 1 wherein refining the image data corresponding to the surface of the tooth disposed beneath the deleted image data corresponding to the at least one appliance comprises smoothening at least a portion of the image data corresponding to the surface of the tooth disposed beneath the deleted image data corresponding to the at least one appliance.

8. The method of claim 1 wherein the image data corresponding to an orthodontic or dental appliance comprises image data corresponding to an orthodontic bracket.

9. The method of claim 8 wherein the image data corresponding to an orthodontic bracket comprises at least a portion of an orthodontic wire.

10. The method of claim 1 wherein the image data corresponding to an orthodontic or dental appliance comprises image data corresponding to an orthodontic band.

11. The method of claim 1 wherein the image data corresponding to an orthodontic or dental appliance comprises image data corresponding to an orthodontic attachment.

12. The method of claim 1 wherein calculating the image data and integrating the image data are performed automatically upon deleting the selected image data corresponding to the at least one appliance from the 3D image.

13. A system for removing image data corresponding to an orthodontic or dental appliance from a 3D image of a patient's teeth comprising:
   a digital workspace configured to display the 3D image;
   an interface disposed within the digital workspace comprising at least one input means for forming a boundary around the image data corresponding to at least one appliance within the 3D image;
   means for deleting the image data corresponding to the at least one appliance within the formed boundary within the 3D image; and
   means for replacing the deleted image data corresponding to the at least one appliance with image data corresponding to a surface of a tooth disposed beneath the deleted image data corresponding to the at least one appliance,
   wherein the interface further comprises a plurality of input means for refining the image data corresponding to the surface of the tooth disposed beneath the deleted image data corresponding to the at least one appliance, and
   wherein the plurality of input means for refining the image data corresponding to the surface of the tooth disposed beneath the deleted image data corresponding to the at least one appliance comprises:
      an input means for removing at least a portion of the image data corresponding to the surface of the tooth disposed beneath the deleted image data corresponding to the at least one appliance;
      an input means for adding to at least a portion of the image data corresponding to the surface of the tooth disposed beneath the deleted image data corresponding to the at least one appliance;
      an input means for defining an intersection between the image data corresponding to the surface of the tooth disposed beneath the deleted image data corresponding to the at least one appliance and image data corresponding to a gingiva margin of the patient within the 3D image; and
      an input means for smoothening at least a portion of the image data corresponding to the surface of the tooth disposed beneath the deleted image data corresponding to the at least one appliance.

14. The system of claim 13 wherein the digital workspace is configured to form the boundary around the image data corresponding to the at least appliance within the 3D image in response to at least one input from a user as received by the interface disposed within the digital workspace.

15. The system of claim 13 further comprising means for calculating the image data corresponding to the surface of the tooth disposed beneath the deleted image data corresponding to the at least one appliance.

16. The system of claim 13 further comprising a database configured to store a current state of the 3D image.

17. The system of claim 13 wherein the system is a component of a web based application.

* * * * *